US005654771A

United States Patent [19]

Tekalp et al.

[11] Patent Number: 5,654,771

[45] Date of Patent: Aug. 5, 1997

[54] VIDEO COMPRESSION SYSTEM USING A DENSE MOTION VECTOR FIELD AND A TRIANGULAR PATCH MESH OVERLAY MODEL

[75] Inventors: A. Murat Tekalp; Yucel Altunbasak; Gozde Bozdagi, all of Rochester, N.Y.

[73] Assignee: The University of Rochester, Rochester, N.Y.

[21] Appl. No.: 447,418

[22] Filed: May 23, 1995

[51] Int. Cl.[6] .......... H04N 7/32

[52] U.S. Cl. .......... 348/699; 382/241

[58] Field of Search .......... 348/416, 413, 348/699, 402, 415, 409, 401, 400, 390, 384; 382/241, 243, 238, 236, 232; H04N 7/137

[56] References Cited

U.S. PATENT DOCUMENTS

| | | | |
|---|---|---|---|
| 4,912,664 | 3/1990 | Weiss | 364/577 |
| 4,941,114 | 7/1990 | Shigyo | 364/578 |
| 5,103,305 | 4/1992 | Watanabe | 382/236 |
| 5,117,287 | 5/1992 | Koike | 348/416 |
| 5,125,038 | 6/1992 | Meshkat | 382/154 |
| 5,214,504 | 5/1993 | Toriu | 348/416 |
| 5,280,530 | 1/1994 | Trew | 382/103 |
| 5,295,201 | 3/1994 | Yokohama | 382/236 |
| 5,376,971 | 12/1994 | Kadono | 348/699 |
| 5,420,638 | 5/1995 | Riglet et al. | 348/409 |

OTHER PUBLICATIONS

H. Li et al, IEEE Trans. Image Proc. No. 5, vol. 3, pp. 589–609 (Sep. 1994), "Image Sequence Coding of Very Low Bitrates: A Review".

K. Aizawa et al, Proc. IEEE, vol. 83, No. 2, p. 259–271 (Feb. 1995), "Model–Based Image Coding: Advanced Video Coding Techniques for Very Low Bit–Rate Applications".

Y. Nakaya and H. Harashima, "Motion compensation based on spatial transformations," *IEEE Trans. Circ. and Syst.: Video Tech.*, vol. 4, pp. 339–356, Jun. 1994.

Y. Wang et al, IEEE Trans. Image. Proc., vol. 3, No. 5 pp. 610–624 (Sep. 1994), "Active Mesh—A Feature Seeking and Tracking Image Sequence Representation Scheme".

A.M. Tekalp, "Digital Video Proc.", Prentcehall Publ (1995) Month not avail., Chapter 5, pp. 72–94.

D.T. Lee et al, Int. J. Comp. & Info. Sciences vol. 9, No. 3, (1980) (Feb.).

B. D. Lucas and T. Kanade, "An iterative image registration technique with an application to stereo vision," *Proc. DARPA Image Understanding Workshop,* pp. 121–130, 1981. (Aug.).

K. Aizawa, C. S. Choi, H. Harashima, and T. S. Huang, "Human Facial Motion Analysis and Synthesis with Application to Model–Based Coding," in *Motion Analysis and Image Sequence Processing,* M. I. Sezan and R. L. Lagendijk, eds., Kluwer Academic Publishers, 1993. (month not avail.).

(List continued on next page.)

*Primary Examiner*—Tommy P. Chin
*Assistant Examiner*—Bryan S. Tung
*Attorney, Agent, or Firm*—M. LuKacher; K. LuKacher

[57] ABSTRACT

In a temporal sequence of digitized image frames of video signals, the spatial and temporal image gradients and the pixel-to-pixel motion vectors (dense motion vectors) are obtained between two consecutive image frames. A shape-adaptive triangular patch mesh model overlay is provided on the first image frame such that the location of node points of each patch is determined by the spatial image gradients of the first frame and the pixel-to-pixel motion vectors. A priority ranking of patches is established before determining the node point motion vectors. The node point motion vectors, representing the motion of each of the node points of the triangular mesh patches, are estimated by a linear least-squares solution to an affine transformation of the mesh overlay on the first frame into the second frame. Failure regions are identified and are revised in accordance with a data bit budget. All data are coded prior to transmission at a constant data bit rate by a sending unit to a receiving unit over a data link.

86 Claims, 12 Drawing Sheets

OTHER PUBLICATIONS

G. Bozdaği, A. M. Tekalp, and L. Onural, "3-D motion estimation and wireframe adaptation including photometric effects for model-based coding of facial image sequences," *IEEE Trans. Circ. and Syst: Video Tech.*, vol. 4, pp. 246–256, Sep. 1994.

H. H. Chen, M. R. Civanlar and B. G. Haskell, "A block transform coder for arbitrarily shaped image segments," *Proc. ICASSP '95*, pp. 85–89, 1994 (month not avail.).

R. Forchheimer et al, IEEE Trans Acoustics, Speech & Signal Proc., vol. 37, NO. 12 (Dec. 1989), "Image Coding–From Waveforms to Animation".

H. Jozawa et al, Proc. Int. Pict. Coding Symp. pp. 238–287 (Sep. 1994).

G.C. Wallace, Communications of the ACM vol. 34 No. 4, pp. 31–44 (Apr. 1991).

J.Y.A. Wang et al, IEEE Trans. on Image Proc., vol. 3, No. 5, (Sep. 1994) pp. 62J–638, "Representing Moving Images with Layers".

J.S. Lim, "Two-Dimensional Signal and Image Processing", Prentice Hall (1990) (month no avail.) pp. 149–163, 497–507.

FIG. 6
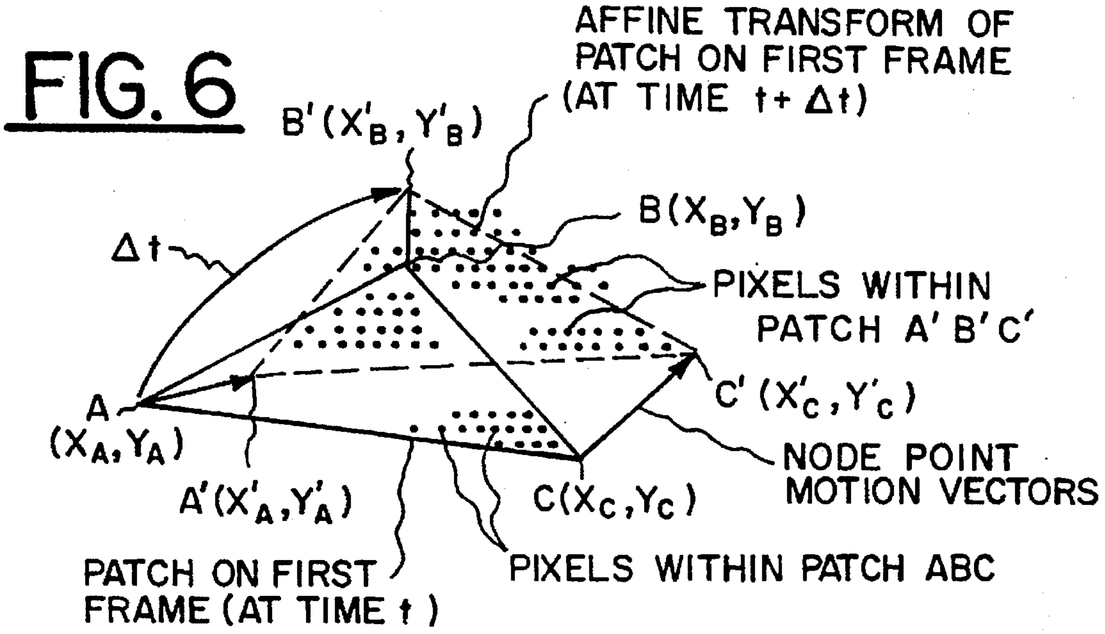
FIG. 7
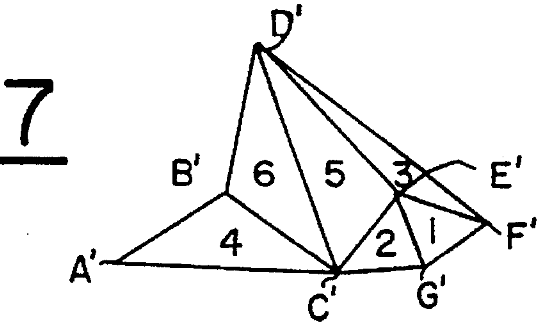
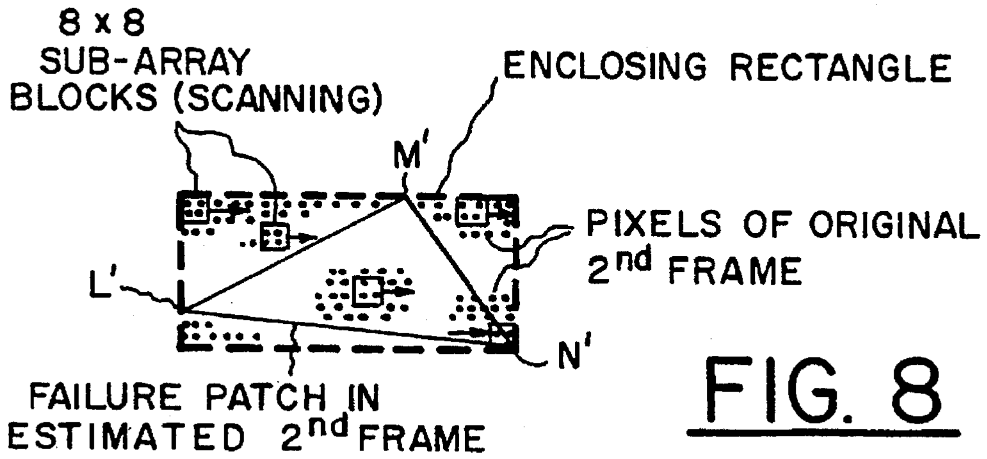
FIG. 8

VIDEO COMPRESSION SYSTEM USING A DENSE MOTION VECTOR FIELD AND A TRIANGULAR PATCH MESH OVERLAY MODEL

FIELD OF THE INVENTION

The present invention generally relates to data compression, and more particularly, the invention relates to a system and method for data compression of digitized video signals representing a temporal sequence of image frames in which at least a portion of a scene content of a current image frame conveys scene content motion with respect to an immediate previous image frame.

BACKGROUND OF THE INVENTION

Due to growing interest in digital video communication on public switched telephone networks and/or mobile channels, the need for data compression has been focused on object-based coding of information to be transmitted from a sending unit to a receiving unit over such data links. Object-based coding (also referred to as model-based coding or analysis-synthesis coding) is evolving as a preferred approach to data compression since the quality of digital video provided by so-called hybrid waveform encoders (such as the ITU-T.H.261 encoder) is considered unacceptable when transmitted at the data bit rates commonly associated with switched telephone or mobile communication channels having a capacity in the range from about 14 to 25 kilobits per second (kbits/sec).

In object-based coding or data compression, an object is considered to be the significant feature of the scene content in a temporal sequence of image frames of video signals, such as for example, the head portion of each of the participants in a video phone conversation. Object-based coding can be classified as three-dimensional (3-Dλ object-based coding or as two-dimensional (2-D) object-based coding. Various approaches under these classifications are reviewed in a publication by H. Li, A. Lundmark, and R. Forchheimer, titled "Image sequence coding at very low bit rates: A Review," *IEEE Trans. Image Proc.*, vol. 3, pp. 589–609, September 1994, and K. Aizawa and T. S. Huang, titled "Model-based image coding: Advanced video coding techniques for very low bit-rate applications," *Proc. IEEE*, vol. 83, no. 2, pp. 259–271, February 1995.

Existing 3-D object-based coding or data compression is not suitable for general purpose communication of video signals because it requires particular wire-frame model overlays on an image frame, based on prior knowledge of the scene content, and such 3-D object-based coding can not, in general, be implemented in real-time. While 2-D object-based coding or data compression does not require such prior scene content knowledge, present 2-D object-based approaches generally call for motion estimation strategies requiring either a global search of an entire image frame or a block-by-block search of the image frame, such relatively time-consuming searches being incompatible with real-time data compression and data transmission of a temporal sequence of image frames. Aspects of such search-based motion estimation strategies can be found in a publication by Y. Nakaya and H. Harashima, titled "Motion compensation based on spatial transformations," *IEEE Trans. Cir. and Syst.: Video Tech.*, vol. 4, pp. 339–356, June 1994, and in a publication by Y. Wang and O. Lee, titled "Active mesh—a feature seeking and tracking image sequence representation scheme," *IEEE Trans. Image Proc.*, vol. 3, pp. 610–624, September 1994.

The following illustrative example may serve to indicate the degree of data compression required in order to transmit in real-time a sequence of frames at a television standard frame rate of 30 frames per second: let a digitized image frame of video signals be represented by a 2-D array of 360×280 picture elements or pixels, each pixel having 8 bits corresponding to pixel signal levels for each one of three color components of a digitized color television signal. Accordingly, such a sequence of frames would have to be transmitted in an uncompressed form at a bit rate of 360×280 ×8×3×30/second=72.58 Mbits/sec, so that frame-to-frame incremental motion of some portion of a scene content would be perceived as flicker-free scene content motion by an observer viewing successive image frames on a television display. If such a sequence had to be transmitted over a data link comprising a public-switched telephone network having a capacity of about 20 kbits/sec, a compression ratio of 72.58 Mbits/sec÷20 kbits/sec≈$3.62\times10^3$—is necessary in this simplified example. Such exceedingly high data compression ratios are not currently attainable, and are in any event not compatible with current data compression standards such as, for example, pertaining to the H.261 standard governing the performance of hybrid waveform encoders, as well as proposed standards referred to as M-JPEG (Motion Joint Picture Experts Group) and MPEG (Motion Picture Experts Group).

In order to arrive at more readily attainable data compression ratios for successive image frames of video signals, investigators have concentrated on data compression of only those significant features or objects of the scene content of successive image frames which contain object motion on a frame-to-frame basis, such as described in the aforementioned publications. Although such search-based data compression can provide moderately high data compression ratios, it has not been possible to date to achieve those ratios at a television display compatible frame rate, that is at a real-time frame rate.

SUMMARY OF THE INVENTION

It is the principal object of the present invention to provide a data compression system for compression of data contained within a sequence of image frames of digitized video signals in which a frame-by-frame search is obviated.

Another object of the invention is to provide a data compression system in which dense motion vectors are obtained representing values and directions of motion of the scene content between a temporally second image frame with respect to a temporally first image frame. The term "temporally" is not restricted to order of occurrence of the frames (dense motion estimation).

A further object of the present invention is to provide a data compression system in which a two-dimensional model of a mesh overlay is generated on the temporally first frame. The mesh overlay model comprises a plurality of interconnected shape-adaptive triangular patches with each patch having node points located at the locations corresponding to the largest spatial and temporal image gradients among two sequential image frames (mesh design).

A still further object of the present invention is to provide a data compression system in which a data compressed estimated second image frame is provided by estimating statistically the motion of each one of the node points of the triangular patches preferably by a least-squares solution to an affine transformation of the temporally previous or first image frame (motion parameterization).

Still a further object of the present invention is to provide a data compression system in which failure regions (model failure MF, uncovered background UB, and background to be covered BTBC) are identified and revised in accordance with a bit-budget representing that fraction of a desired data-bit rate transmission allocated to such failure regions (adaptive thresholding for buffer regulation).

Another object of the present invention is to provide a data compression system in which failure regions (MF and UB) in the data-compressed estimated second image frame are identified and replaced by a rectangular coordinate array of pixels of the uncompressed second image frame which encloses the failure region (adaptive failure coding).

Another object of the invention is to provide a data compression system in which, when a number of pixels in failure regions in a data compressed estimated second image frame is in excess of a predetermined fraction of the total number of pixels therein, the frame is designated as a new first image frame.

The invention may be practiced to obtain and achieve one or more, and not necessarily all, of the foregoing objects.

Briefly described, the present invention provides, in accordance with a presently preferred embodiment, a system for data compression of data contained in a temporal sequence of image frames of video signals in which a temporally second image frame is synthesized or estimated from the scene content of a temporally first or previous image frame by an overlay of an adaptive triangular mesh on said first image frame in response to spatial and temporal image gradients computed using uncompressed frames in a sequence of frames, referred to as an uncompressed first and an uncompressed second image frame, and wherein data compression in the synthesized or estimated second image frame occurs through compression of individual pixel data into node point motion vectors representing the motion of each of the node points of the triangular mesh patches. The node point motion vectors are determined statistically, preferably by a linear least-squares solution to an affine transformation of the first image frame; the connectivity of the interconnected triangular mesh patches being preserved by the constraint that each node point common to adjoining triangular patches must have one and the same node point motion vector. The estimation of node point motion vectors for each of the triangular patches occurs in accordance with a priority ranking of the mesh patches and associated node points. Failure regions are first identified and are then revised on the basis of a data-bit budget allocated thereto. Each of the failure regions, (MF, UB) and alternatively each one of the revised failure regions is assigned a designation, as is each of the remaining triangular patches of the shape-adaptive triangular mesh overlay model. Data representing the node designations of each of the triangular patches, the signal levels of pixels of the original second frame corresponding to the identified failure regions and alternatively corresponding to the revised failure regions, the node point motion vectors, and the pixel signal levels of all pixels of the temporally first image frame are then coded and transmitted at a constant data bit-rate from a sending unit over a data link to a receiving unit in accordance with a communication standard. In the receiving unit the data are decoded to form a temporal sequence of image frames of video signals for display.

BRIEF DESCRIPTION OF THE DRAWINGS

FIG. 6 is a schematic representation of the affine transformation of a triangular patch having node points A, B, and C into a transformed triangular patch having node points A', B', C', and indicating node point motion vectors connecting the node points of the patch on the first frame at a time t to the transformed patch on the first frame at a time t+Δt.

FIG. 7 is a schematic representation of a plurality of interconnected shape-adapted triangular patches having node points A'–G' and having patch designations shown as numerals 1–6 in accordance with a rank ordering of the patches.

FIG. 8 is a conceptual rendition of a triangular failure patch within a data compressed estimated second image frame with the triangular patch L', M', N' being enclosed by a rectangle comprising 8×8 sub-array blocks of pixels of the original uncompressed second image frame.

DETAILED DESCRIPTION OF THE EMBODIMENT

Figure 1:
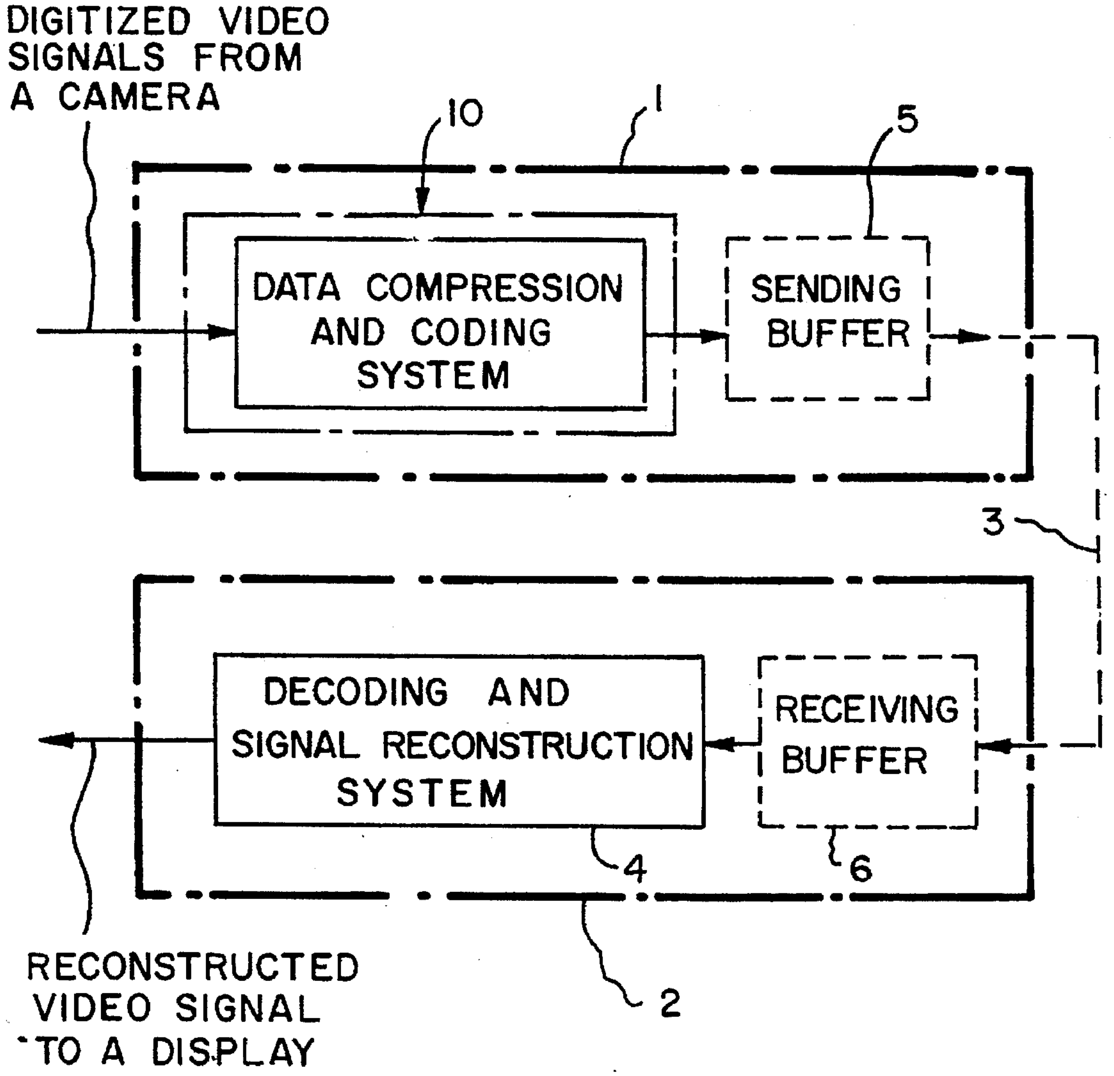
FIG. 1 is a schematic block diagram showing a sending unit including a data compression and coding system and an optional sending buffer, as well as a receiving unit having an optional receiving buffer and a decoding and signal reconstruction system, an output of the sending unit being connected to an input of the receiving unit by a data link.

Referring now to FIG. 1, there is shown a schematic block diagram of a sending unit 1 and a receiving unit 2 in which an output of the sending unit is connected to an input of the receiving unit by a data link 3. The data link 3 can be, for example, telephone lines of a public switched telephone network or a fiber-optic cable. The sending unit 1 includes a data compression and coding system 10 whose output is connected to an optional sending buffer 5 and whose input receives digitized video signals from a camera. The digitized video signal input is represented by a temporal sequence of image frames in which each image frame comprises a two-dimensional coordinate array of a number of digitized picture elements or pixels having associated pixel signal levels corresponding to a scene content. The scene content may be a dominant feature of an image frame such as, for example, a head portion of a participant in a video phone conversation. Thus, a first image frame of the temporal sequence of image frames may show in a central portion of that frame a head portion as a dominant scene content and in a particular position relative to the coordinates of the two-dimensional array of pixels, while a temporally second image frame may show the head portion in a slightly moved, rotated, or tilted position with respect to the position in the first image frame. Accordingly, it will be apparent that at least one pixel region of the second image frame corresponds to motion of the scene content with respect to an identical pixel region of the first image frame of the sequence. Analog-to-digital converters are well known as means for converting frames of video signals into digitized representations thereof. A coded bitstream consists of data corresponding to the sequence of image frames. This data represents certain information obtained by processing the pixels, namely data representing node designations of triangular patches of a mesh overlay on the first frame image, the pixel signal levels of pixels of the original second frame corresponding to identified failure regions (MF and UB) and alternatively revised failure regions (revised in accordance with a desired bit budget (data rate) for the coded bitstream), node point motion vectors, and the pixel signal levels of the pixels of the first frame.

The receiving unit 2 includes an optional receiving buffer 6 whose output is connected to a decoding and signal reconstruction system which provides a reconstructed sequence of video signals for viewing on a display.

Figure 2:
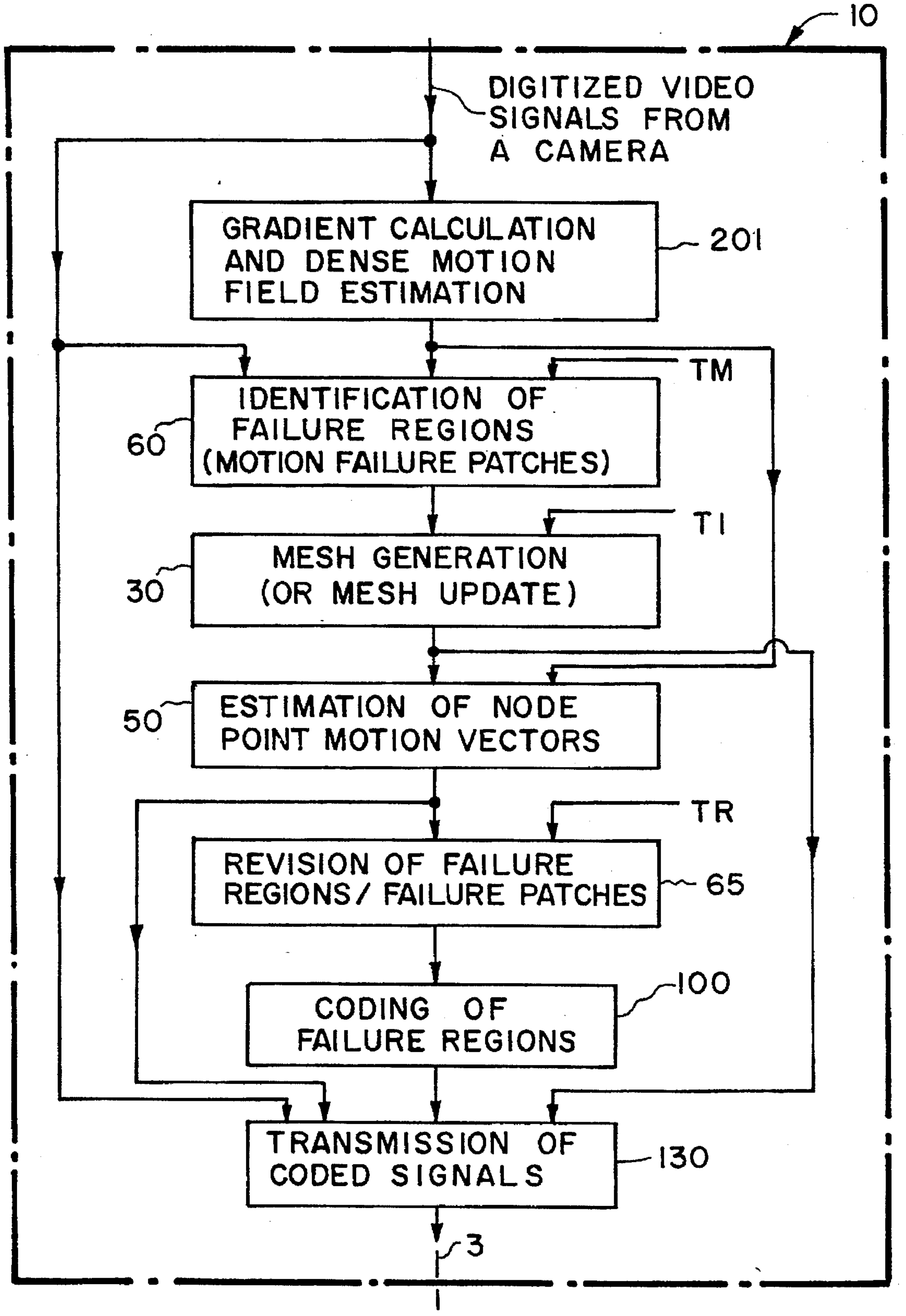
FIGS. 2 and 2A are schematic diagrams of the data compression and coding system of FIG. 1, indicating major elements and functions of the data compression and coding system in accordance with the present invention, FIG. 2A providing a more detailed-explanation of the members shown in FIG. 2.

Referring first to FIG. 2, there is shown a simplified, schematic diagram of the data compression and coding system of FIG. 1, indicating major members and functions of the data compression and coding system. These members are described in greater detail in connection with FIG. 2A and other figures hereof. The gradient calculation and dense motion field estimation member 201 calculates the spatial gradients of the first and second image frame and computes the motion vectors at each pixel location. The functions of the member 201 can be better understood by reference to FIGS. 3A and 3B and FIG. 4.

A failure identification member 60 identifies BTBC regions within the first image frame using the dense motion vectors, the second frame and a given threshold Tm.

An adaptive mesh generation member 30 is used to generate a two-dimensional model of a mesh overlay such that the mesh model comprises a plurality of interconnected and shape-adaptive triangular patches with each patch having node points and associated node point coordinates.

A node point motion vectors estimation member 50 provides for the estimation of a data-compressed second image frame by estimating the motion of each node point of each one of the triangular patches using an affine transformation.

Another failure region identification and revision member 65 is used to detect and update the MF and UB failure regions in accordance with a bit budget.

A failure region coding member 100 is used to assign a designation to each one of the MF and UB regions and to code these regions and designations.

A signal transmission member 130 is used for transmission of data via the data link 3 to the receiving unit 2 in accordance with a communication standard.

Figure 2A:
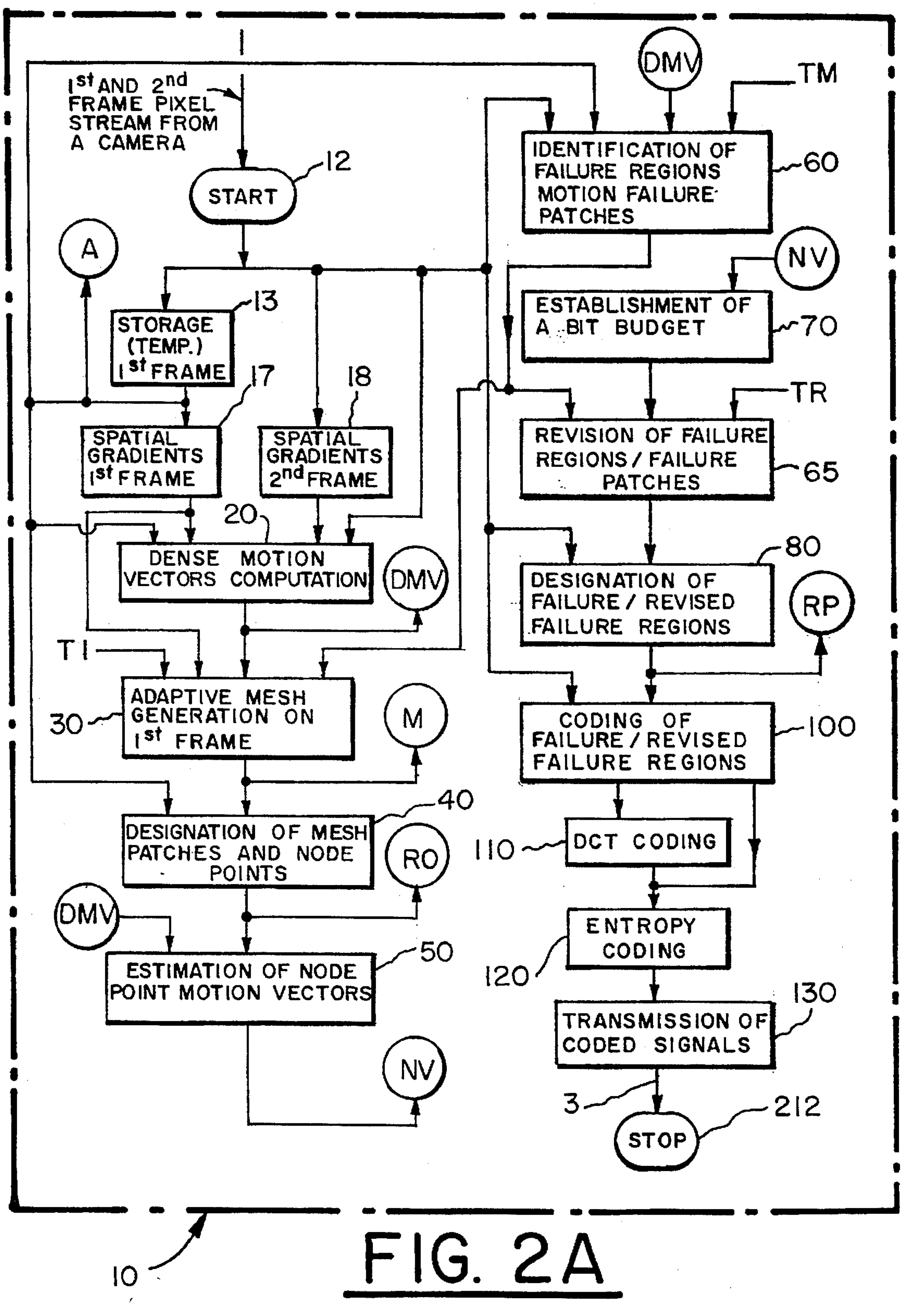

Referring now to FIG. 2A, there is a detailed, schematic diagram of the data compression and coding system of FIG. 2. In discussing the major elements of the data compression and coding system 10, reference will be made to FIGS. 3A, 3B, 4, 5, 6, 7, and 8 which may aid in the understanding of the functions of some of the components of the system.

Upon actuating a start command, 12 pixels representing a first image frame of a temporal sequence of frames are inputted to a first frame pixel storage member 13 for temporary storage therein. The storage member 13 can be a conventional frame store device well known in the art. Temporary storage of the signal levels of the first frame pixels is of a duration of one image frame.

Pixels associated with a temporally second image frame are inputted to one input of a second frame spatial gradients determining member 18, to one input of a dense motion vector determining member 20 as well as to a failure region (MF and UB) designation member 80 and a failure region (MF and UB) coding member 100.

The output of the first frame pixel storage member 13 is connected to an input of a first frame spatial gradients determining member 17, to one input of a mesh patch designation member 40, to one input of a dense motion vector determining member 20, to one input of a BTBC regions identification and revision member 60, and to one input of a MF and UB regions identification member 65.

Figure 3A:
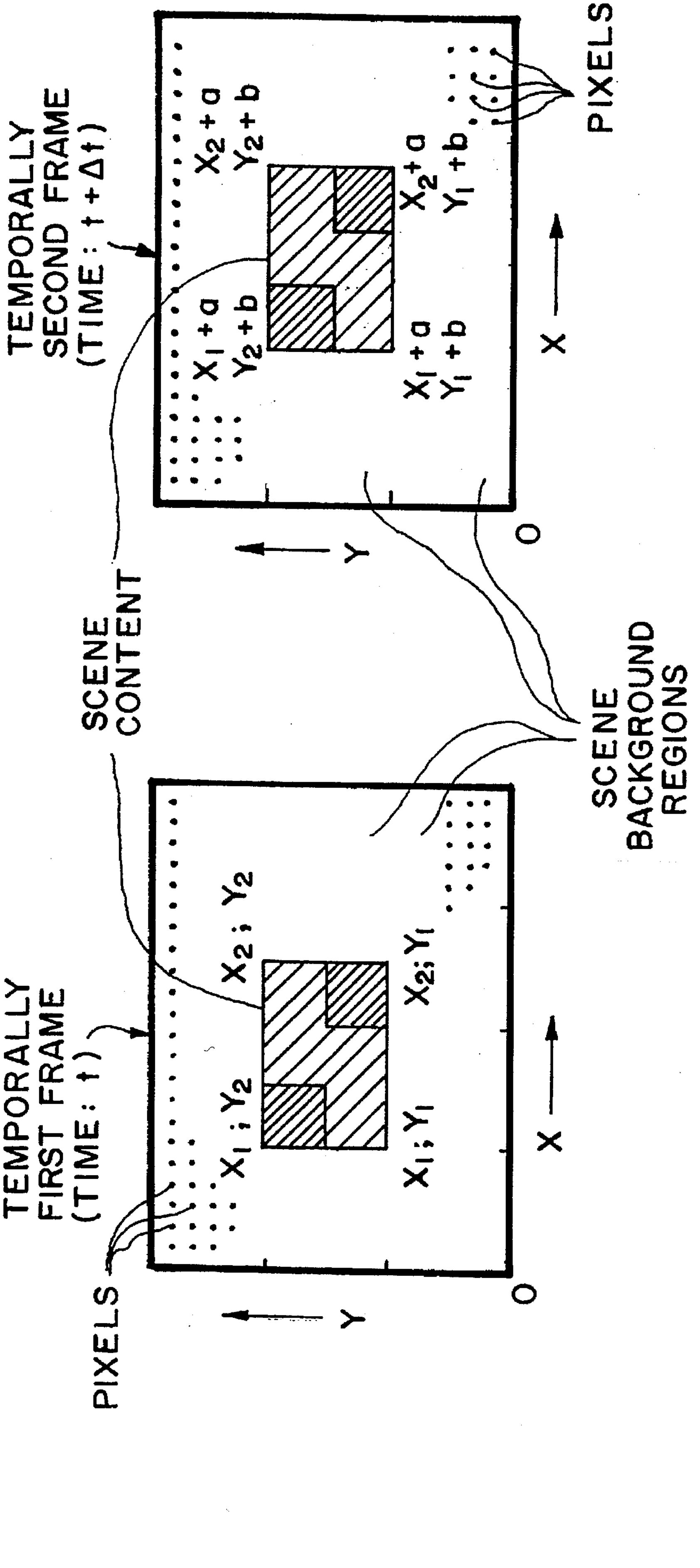
FIG. 3A is a simplified representation of a temporally first image frame having a scene content, and a temporally second image frame showing the scene content as having moved in respective X and Y directions relative to the scene content of the first image frame.
Figure 3B:
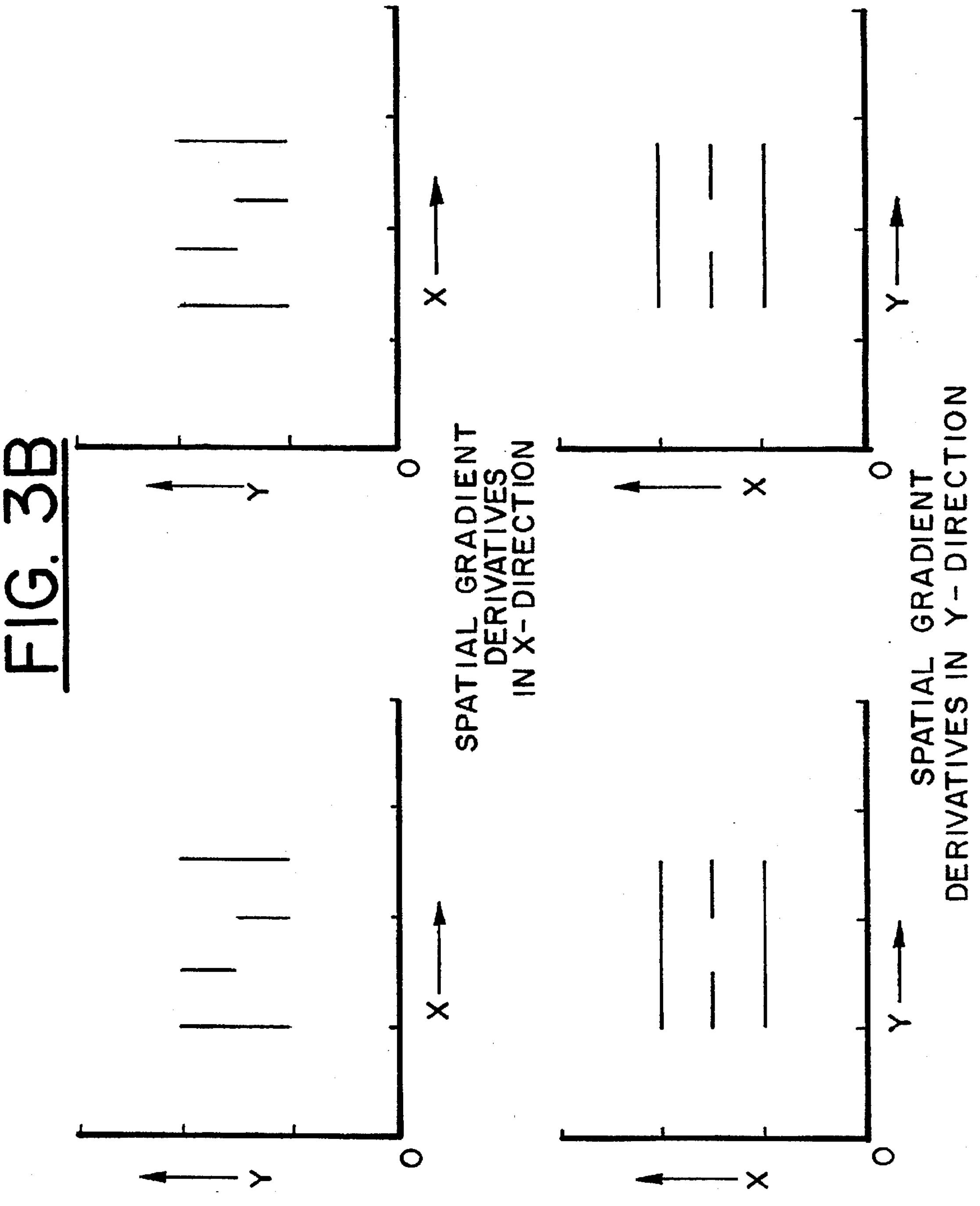
FIG. 3B schematically indicates the spatial gradients of the scene content of the first frame and the spatial gradients of the second frame with reference to FIG. 3A.

The first and second frames spatial gradients determining members 17 and 18 can be combined in a single microprocessor. The functions of members 17 and 18 can be better understood by reference to FIGS. 3A & 3B. The first frame spatial gradients determining member 17 is used to determine the values and coordinate locations of the spatial image gradients of the temporally first image frame on a pixel-to-pixel basis. Schematic representations of a first frame scene content, depicted as a rectangularly shaped scene content having a certain opacity with respect to a background of the scene is shown at a time t on the left side of FIG. 3A, where the x and y coordinates of the corners of the rectangular scene content are indicated. Shown on the left of FIG. 3B is a schematic rendition of the spatial gradients in x and y coordinate directions of the first frame scene content of FIG. 3A. The spatial gradients are derivatives and are, accordingly depicted as lines corresponding to the spatial edges of the scene content. For illustrative purposes only, the right side view in FIG. 3A shows a rectangularly shaped scene content of a temporally second frame at a time $t+\Delta t$, wherein the scene content of the second frame has shifted by an increment "a" along the x direction and by an increment "b" in the y direction relative to the location of the scene content in the temporally first image frame. Spatial gradients corresponding to the shifted scene content of the temporally second frame are shown in the right view of FIG. 3B, as determined by the second frame spatial gradients determining member 18.

Figure 4:
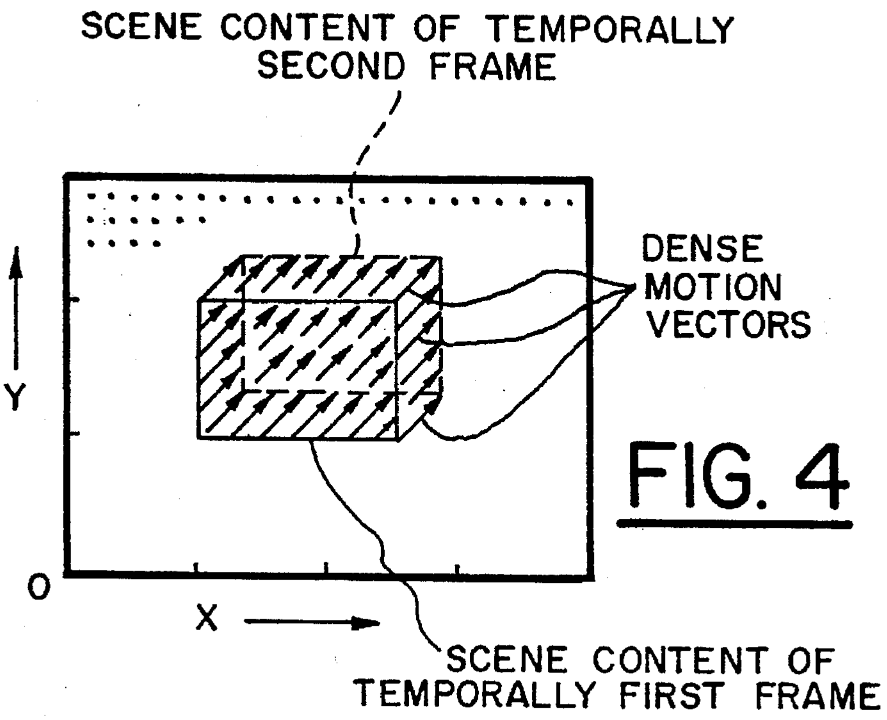
FIG. 4 shows schematically, within a single frame having X and Y coordinates, a scene content of a temporally first frame and the scene content of a temporally second frame, the scene content differences or displacements being represented as a plurality of dense content motion vectors.

The dense motion vector computing member 20 computes the pixel-to-pixel motion using one of the motion estimation algorithms reported in "Digital Video Processing, Prentice Hall, 1995," by A. Murat Tekalp, representing the values and directions of motion of the scene content of the temporally second image frame with respect to the scene content of the temporally first image frame, as schematically indicated in FIG. 4.

A (BTBC) identification member 60 identifies those failure regions within the first frame using the dense motion vectors and the second frame. The failure regions are the regions where the dense motion vector estimation was inadequate or inaccurate. Inputs to member 60 are the signal levels of the first and the second frame pixels, the dense motion vectors and a threshold level Tm. The failure-identifying threshold level Tm is selected such that a pixel is identified as belonging to a failure region if a displaced frame difference (DFD) at this location is greater than a function of the threshold Tm and the scene-content (spatial edges). BTBC is identified to be a closed shape whose boundary aligns with the spatial edges.

An adaptive mesh generation member 30 is used to generate a two-dimensional model of a mesh overlay on the first image frame such that the mesh model comprises a plurality of interconnected and shape-adaptive triangular patches with each patch having node points and associated node point coordinates. The node points are defined in their location under the influence of a mesh-generating threshold level T1 provided at one input of member 30, and in response to the dense motion vectors computed by member 20 whose output is connected to another input of the mesh generation member 30 and in response to the failure regions (BTBC) which are computed by member 60 whose output is connected to another input of the mesh generation member 30.

Once the node points are located, a standard triangulization algorithm is used to form the patches. Triangular mesh models per se are known in the art and are referred to as a Delauney Triangularization, as for example, described in a publication by D. T. Lee, and B. J. Schachter, titled "*Two Algorithms for Constructing a Delauney Triangulization*," Int. J. Computer and Information Sciences, vol. 9, no. 3, 1980. Stated in another way, the shape of each shape-adaptive triangular patch is shape-adapted in correspondence with the dense motion vectors which can be envisioned as modulating the shape-adaptive triangular patches of the mesh overlay, so that smaller and more numerous triangular patches are formed in regions corresponding to regions with high motion and high spatial activity. A further refinement of patches can also be achieved using what is known as a split-and-merge algorithm.

Figure 5:
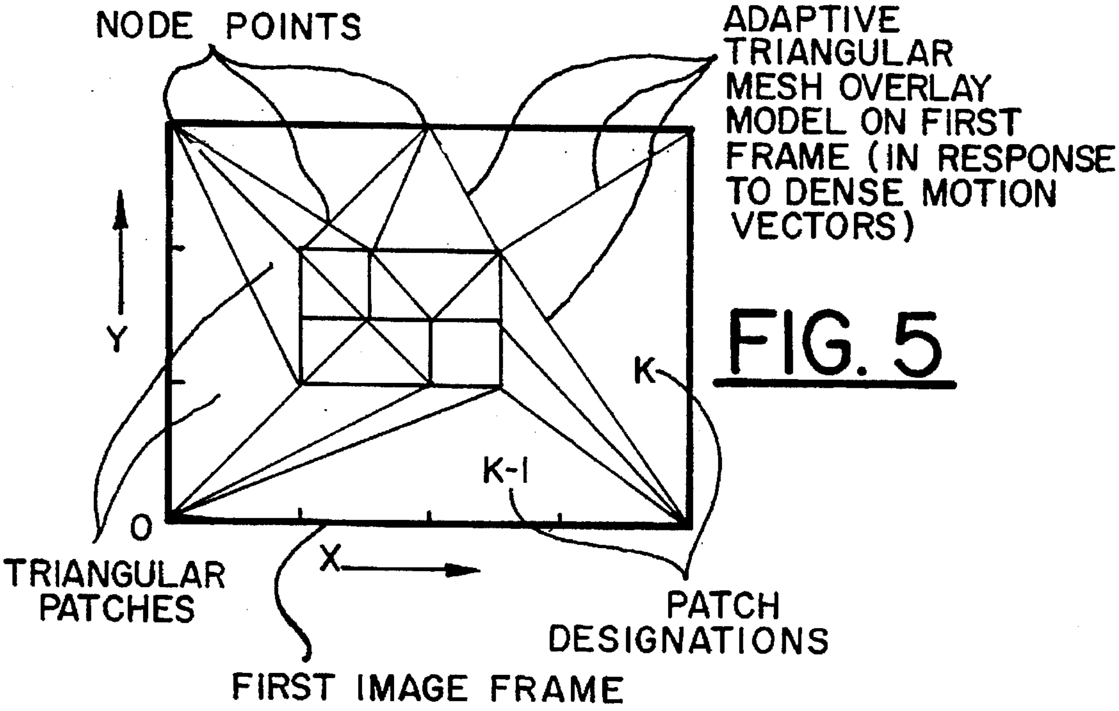
FIG. 5 indicates schematically and on a single X, Y coordinate frame an adaptive triangular mesh model overlay on a first image frame in response to the dense motion vectors of FIG. 4, with triangular patches shown as being more numerous and of smaller patch size in the vicinity of the edges of the scene contents of the first and second image frames which are shown for illustrative purposes only.

A schematic representation of a shape-adapted triangular mesh model overlay on a first image frame in response to dense motion vectors is shown in FIG. 5 for a full image frame in which the scene content (see FIG. 3A) is represented by triangular patches having node points, and wherein patch designations are schematically indicated.

In FIG. 7, there is shown a portion of a triangular mesh model having triangular patches defined by node points A'–G' and having patch designations 1–6 in accordance with certain patch designation constraints to be described in more detail hereinafter.

For a new first image frame, first a motion segmentation algorithm is employed to determine the regions with different motions. Motion segmentation algorithms are known in the art, as for example, described in a publication by J. Y. A. Wang and E. H. Adelson, titled, "Representing moving images with layers," IEEE Trans. Image Proc., vol. 3, no. 5, September 1994, pp. 625–638.

For each segment representing motions at least the following steps are taken:

(a) Get the number of node points, mark all the pixels in the temporarily first frame which fall into the failure regions (BTBC), and fit a polygon around BTBC which determines the initial node points.

(b) Using the dense motion field, compensate the temporarily second frame and find the displaced frame difference (DFD).

(c) Find the average $DFD^2$ per node point using all the pixels excluding BTBC in the temporarily first frame, and grow a region about the initial node points until the square of DFD in this region is greater than the average.

(d) Find the point with the largest spatial gradient on the temporarily first frame and which is not closer to another node point than a certain minimum distance and which is not marked. Put a node at this location.

(e) Grow a region about the point with the largest gradient until the square of DFD ($DFD^2$) in this region is greater than the average. Mark this region such that it will not include any more node points.

(f) If all the node points are used, stop. Otherwise, increase the number of used points by one and return to step (b).

Once the node points are selected, the triangulization algorithm is applied for each segment. The generated meshes are then combined to obtain the overall mesh. If the DFD within each patch is high, divide this triangle further using a split-and-merge algorithm.

Briefly described, the mesh-generating constraints are as follows:

(i) The distances between the node points that will be used in mesh generation is specified by T1 and the displaced frame difference (DFD) such that the DFD within a neighborhood of any node point is the same;

(ii) The node points overlaid on the first image frame must be located wherever the first frame spatial image gradients are above a threshold level, so as to enforce triangular patches to align with spatial edges or sharpest spatial gradients and motion edges.

(iii) Node points cannot be spaced closer to one another than a certain minimum distance, so as to ensure that each triangular patch is large enough to avoid a so-called aperture problem in motion estimation of the node points, and wherein the minimum distance is a coordinate distance selected on the basis of the number of pixels contained in the two-dimensional array of pixels in the first image frame.

(iv) Node points should not coincide with BTBC regions of the scene content, where a BTBC region can be a sub-region within the dominant scene content such as, for example, the mouth and eyes of a head portion of a participant in a video phone exchange, since both the mouth and the eyes constitute sub-regions of the scene content which can move even if the outline of the major scene content, i.e., the outline of the head portion, does not move perceptibly among successive image frames.

The node point and mesh patch designation member 40 is used for rank ordering the triangular patches on the basis of the values and directions of the dense motion vectors obtained from the gradient difference computing member 20, and located within each patch, in accordance with the following relationship, $$O_k = \alpha_1 \frac{D_k}{N_k} + \alpha_2 \frac{1}{\sigma_k^2},$$

where $O_k$ is the rank order of a patch k $\alpha_1$, $\alpha_2$ are positive scalars selected such that $$\alpha_1 \frac{D_k}{N_k}$$

and $$\alpha_2 \frac{1}{\sigma_k^2}$$

are of the same order, $$D_k$$

is the displaced frame difference (DFD) within a patch k, $$N_k$$

is the total number of pixels within a patch k, and $$\sigma_k^2$$

is the variance among the pixel signal levels within a patch k.

Patches having the highest variance are assigned the highest rank and correspondingly highest priority for data processing.

Thus, the rank ordering of patches in accordance with the above relationship designates a priority for processing of those patches providing the highest degree of confidence on an estimated node point motion, and having a highest spatial image activity.

The rank order relationship can also be modified to be any function of $$D_k,$$

$N_k$, and $$\sigma_k^2.$$

Accordingly, a triangular patch 1 in FIG. 7 is shown to have the highest ranking and accordingly the highest priority for determination of the locations of its associated moved or translated node points E', F', and G', while patches 4, 5, and 6 would have a relatively lower processing priority, i.e., their respective node point locations represent regions of lower spatial gradients and higher displaced frame differences among the two successive frames.

The node point motion vectors estimation member 50 provides for the estimation or synthesis of an estimated or synthesized data-compressed second image frame, by estimating the motion of each node point of each one of the triangular patches and expressing such node point motion in the form of an estimated node point motion vector. Thus, the node point motion vectors represent the motion or shifting of node points with respect to the coordinates of the node points of the original mesh overlay in response to the dense motion vectors. Briefly described, the node point motion vector estimation is performed by an affine transformation of a triangular patch overlaid on the first image frame at a time t into a patch on the first image frame at a time t+Δt, wherein the latter triangular patch is displaced from the former patch by up to three node point motion vectors which, under affine transformation requirements, contain an estimate of all the information contained within the former or original triangular patch.

In FIG. 6 there is shown schematically a rendition of such affine transformation. Here, an original triangular patch overlaid on a first image frame at a time t and having node points A, B, and C with respective node point coordinates $x_A$, $y_A$; $x_B$, $y_B$; and $x_c$, $y_c$, undergoes affine transformation into a transformed triangular patch with node points A', B', and C' with respectively associated node point coordinate locations. The affine transformation is taking place during a time period Δt which is the time period between the first frame and the second frame in the temporal sequence of image frames. The three node point motion vectors outlined as bold arrows linking the respective node points A, B and C with the transformed node points A', B' and C' are not only representative of the node point motion, but also represent, at least in principle, all of the information contained within the triangular patch A, B, C. Stated differently, the node point motion vectors together represent an estimate of an information-compressed second frame of the triangular patch A, B, C.

Affine transformation or affine motion are well known in the art of image processing, and affine transformation includes the translation, rotation, scaling, zooming, and skewing of image points in both the x and y directions of a coordinate system. However, heretofore, the computational requirements to derive affine coefficients or affine parameters, from which the new node point locations can be extracted, have been relatively substantial and time consuming. The present invention provides for a fast linear least-squares solution to the affine transformation of each of the triangular patches to arrive at ending coordinates of the node point motion vectors (the coordinates of node points A', B', and C') from the starting coordinates of these node point motion vectors (the coordinates of the node points A, B, and C).

The following relationships govern the derivation of the motion of each pixel within a triangular patch to respective new coordinate locations in a corresponding affine transformation patch in the node point motion vector estimation member 50:

$$\tilde{u}_j = \tilde{x}'_j - x_j = (a_{i1} - 1)x_j + a_{i2}y_j + a_{i3}$$

$$\tilde{v}_j = \tilde{y}'_j - y_j = a_{i4}X_j + (a_{i5} - 1)y_j + a_{i6},$$

where $$x_j, y_j$$

are the coordinates of a pixel, j, within a patch i of the first image frame, $$\tilde{x}'_j, \tilde{y}'_j$$

are the estimated coordinates of a matching pixel within the patch i of the estimated second image frame, $$\tilde{u}_j, \tilde{v}_j$$

are the estimated parametric motion vectors of the pixel j, and $a_{i1}, \ldots a_{i6}$ are affine parameters for patch i, and wherein $u_j=(x'_j-x_j)$ and $v_j=(y'_j-y_j)$ are optical flow constraints or estimates.

An estimate of the node point motion vectors of the three node points of a transformed first triangular patch overlaid on the first image frame is determined in accordance with the following relationship, $$\sum_{j=1}^{N_i} (\tilde{u}_j - u_j)^2 + (\tilde{v}_j - v_j)^2$$

where $N_i$ is the number of estimated and modified dense motion vectors (DMV) within the ith triangular patch, the relationship being minimized with respect to the affine parameters $a_{i1}, \ldots, a_{i6}$ by an application of a linear least-squares solution in accordance with the following relationship, $$\begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ & & \cdot & & & \\ & & \cdot & & & \\ & & \cdot & & & \\ x_{Ni} & y_{Ni} & 1 & 0 & 0 & 0 \\ 0 & 0 & 0 & x_{Ni} & y_{Ni} & 1 \end{bmatrix} \begin{bmatrix} a_i \\ a_{i2} \\ a_{i3} \\ a_{i4} \\ a_{i5} \\ a_{i6} \end{bmatrix} = \begin{bmatrix} x_1' \\ y_1' \\ x_2' \\ y_1' \\ \cdot \\ \cdot \\ \cdot \\ x_{Ni}' \\ y_{Ni}' \end{bmatrix}$$

where $x_1, \ldots x_{Ni}$, and $y_1, \ldots Y_{Ni}$ are the respective starting coordinates of all $N_i$ dense motion vectors within the ith triangular patch of the first image frame $x'_1, \ldots, x'_{Ni}$, and $y'_1, \ldots, y'_{Ni}$ are the respective ending coordinates of all $N_i$ dense motion vectors within the ith patch of the estimated or synthesized second image frame $a_{i1}, \ldots, a_{i6}$ are the affine parameters, and wherein the node point motion vectors of the three node points are included therein and can be extracted therefrom.

Alternatively, the node point motion vector estimation member 50 can be configured to determine the estimate for the three node points of a first triangular patch in accordance with the following relationship, $$\sum_{j=1}^{N_i} (I_x\tilde{u}_j + I_y\tilde{v}_j + I_t)^2$$

where $N_i$ is the number of pixels within the first triangular patch of the ith image frame $I_x$, $I_y$ are the spatial image gradients in respective x and y directions of the $N_i$ pixels within the ith patch of the first image frame, and $I_t$ is a temporal gradient within the ith patch of the first image frame, this relationship again being minimized with respect to the aforementioned affine parameters $a_{i1}, \ldots, a_{i6}$ in terms of the spatio-temporal image gradients and point coordinates by the application of the linear least-squares solution to determine the estimate of the node point motion vectors under the triangular constraint which will be described hereinafter.

Thus, node point motion of node points of triangular patches, expressed as node point motion vectors, is determined by an affine transformation of a triangular patch formed on the first image frame at a time t into a triangular patch of a second frame, but at a time t+Δt, i.e., in response to the DMV between the two frames.

In a triangular patch having a high priority ranking, for example patch 1 in FIG. 7, the motion of all three node points of that triangular patch would be determined first by solving the aforementioned matrix equation with its six affine parameters or coefficients through the linear least-squares solution. Accordingly, the transformed node points E', F', and G' of the patch 1 in FIG. 7 would have been determined in terms of their coordinates. The connectivity of the transformed interconnected triangular patches is preserved in the affine transformation by the following connectivity-preserving constraints: each node point common to adjoining triangular patches must have one and the same node point motion vector. For example, in determining the node point motion of patches 2 and 3 in FIG. 7, only respectively single and as yet undetermined transformed node points C' and D' have to be determined, since the transformed node points E' and G', previously determined for patch 1, are in common with patch 2, and previously determined node points E' and F' are in common with patch 3.

Figure 12:
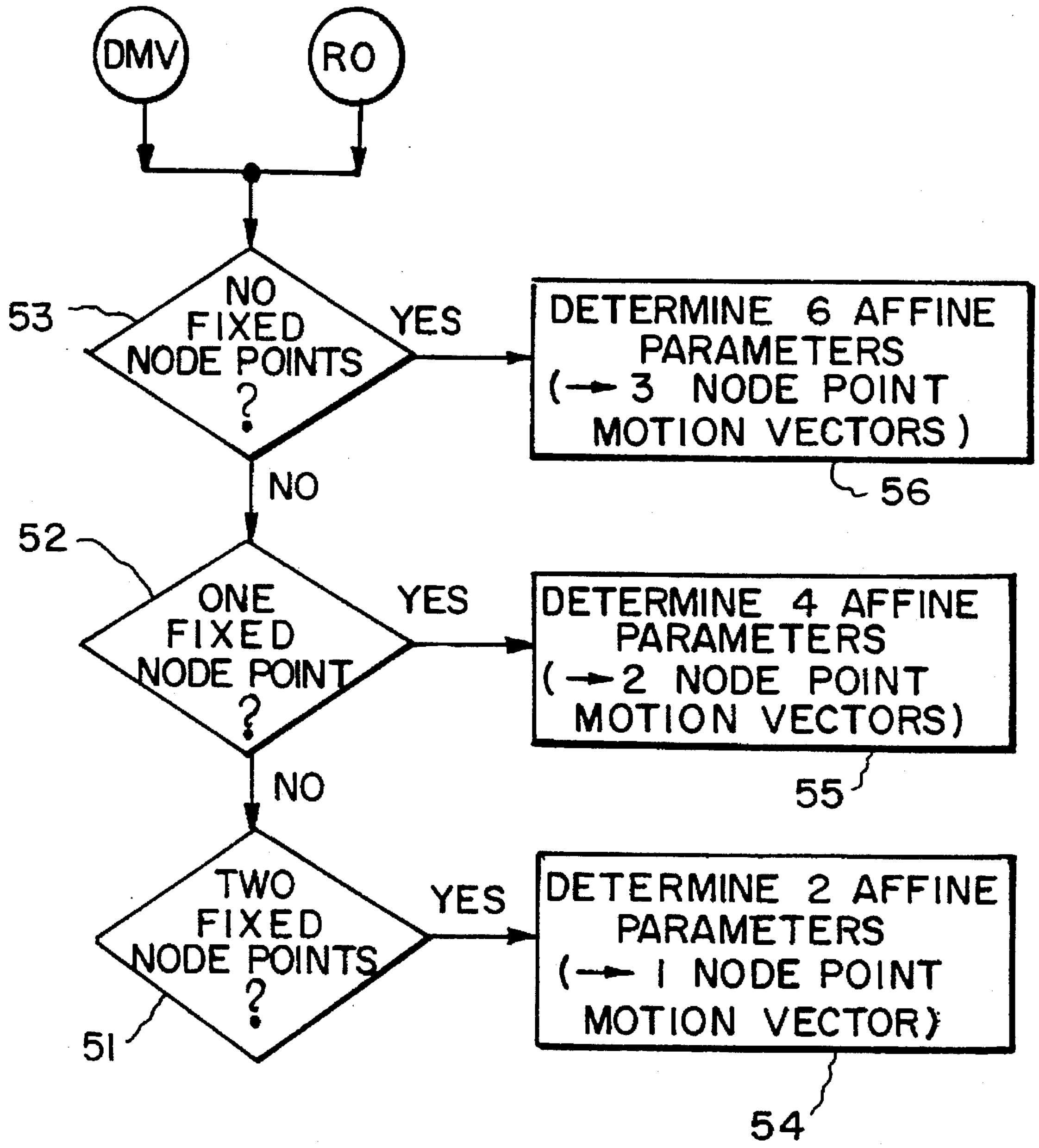
FIG. 12 indicates schematically the determination of the affine parameters associated with the motion of the node points and having sequential decision elements dedicated to deciding respectively the absence of previously fixed node points, the presence of one previously fixed node point, and the presence of two previously fixed node points, so as to preserve the connectivity of the interconnected triangular patches of the mesh overlay model.

In view of these connectivity-preserving constraints, the node point motion vector estimation member 50 contains a sequence of decision elements for deciding whether a particular transformed triangular patch had none of its transformed node points fixed by a previous determination, whether it had one node point fixed previously, or whether it had two node points fixed or determined previously (see FIG. 12). As indicated above, all three of the transformed node points of the highest ranked triangular patch will be determined first, requiring a least-squares solution of the matrix equation containing six affine parameters or coefficients. For a triangular patch having one node point fixed or determined previously, and in common with an adjoining triangular patch, the remaining two node point motion vectors can be determined by the least-squares solution of the matrix equation including four affine parameters. Finally, if two node points of a transformed triangular patch are shared among adjoining patches, only one remaining node point motion vector needs to be determined, requiring two affine parameters in the matrix equation.

In FIG. 12 are schematically indicated the elements comprising the node point motion vector estimation member 50. A sequence of decision elements 53, 52, and 51 are used to decide whether none, one, or two transformed node points had been previously fixed or determined for a particular transformed triangular patch. The inputs to the first node point decision element 53 are the dense motion vectors (DMV) from the output of the dense motion determination member 20, and the rank ordered patch designations (RO) from the output of the node point and mesh patch designation member 40. If none of the transformed node points had been previously determined for a highly ranked triangular patch, an associated determining member 56 uses six affine parameters to determine through the least-squares solution of the matrix equation the three node point motion vectors corresponding to the three transformed node points of that highly ranked triangular patch. If one transformed node point has been previously fixed or determined, decision element 52 actuates a determining member 55 in which four affine parameters or coefficients are used to determine the remaining two node point motion vectors corresponding to the motion of the respective node points. If two transformed node points have been fixed or determined previously, such as for example the node points of an adjoining triangular patch, a decision element 51 actuates a determining member 54 to select two affine parameters for determination of the one remaining node point motion vector corresponding to the one remaining transformed node point.

Figure 13:
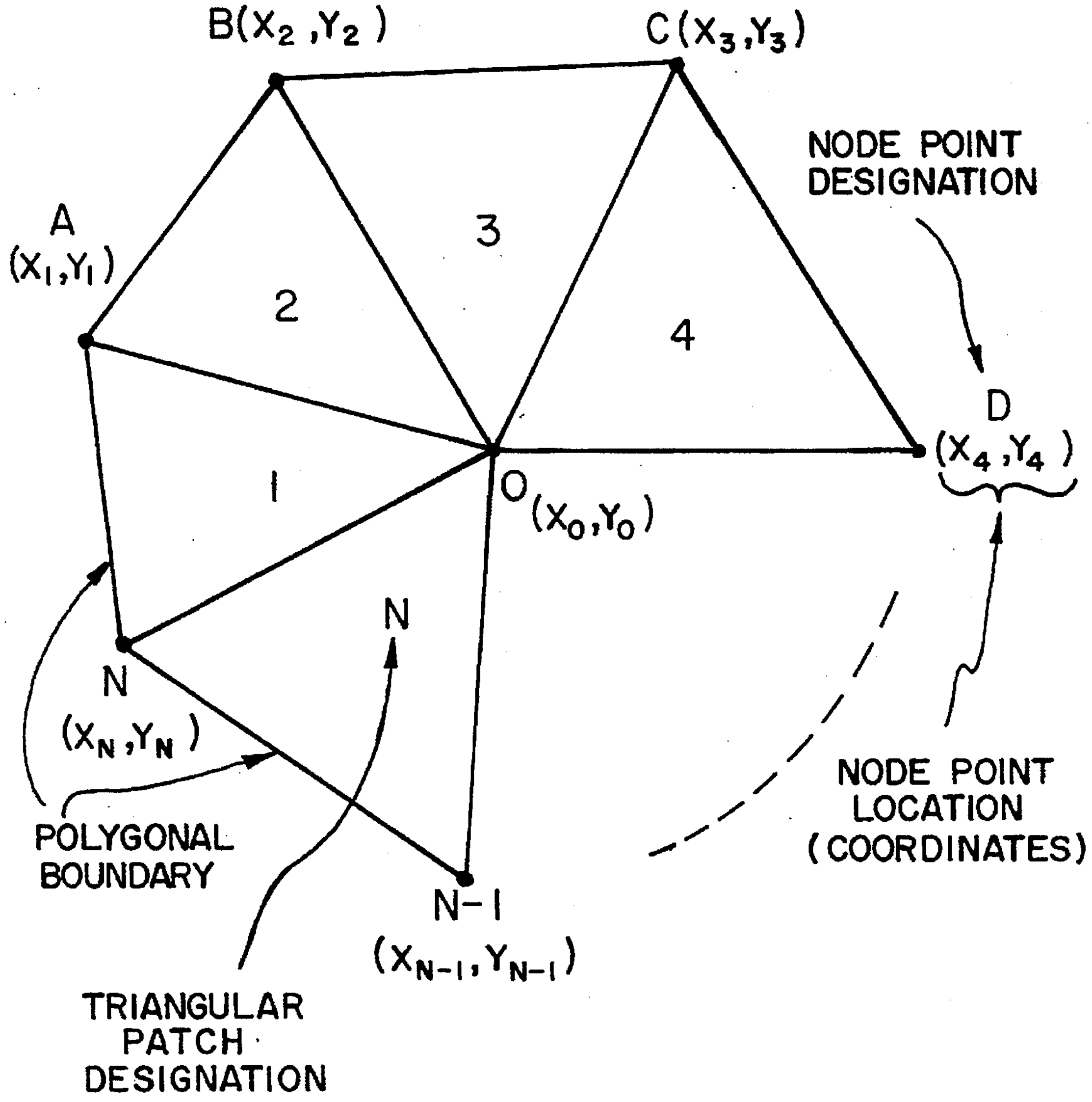
FIG. 13 is a schematic representation, akin to that of FIG. 7, but with patches in a polygonal (hexagonal) arrangement.

Alternatively, the members 51, 52, 53 can be configured to utilize a hexagonal constraint described in the article by Y. Nakaya et al. which is referenced above. However, an analytical solution is preferred to find the node point motion vectors, using the polygonal boundary constraint as follows:

Referring to FIG. 13, there is shown how node motion is stated using polygonal boundary constraints. Consider N triangles connected to a node ($x_0$, $y_0$). The triangles are labeled from 1 to N, and the nodes are labeled A and N.

For example, in FIG. 13, patches 1, 2, 3, 4 . . . N−1, N are connected to node 0. To find the node point motion vector of node 0, the DFD is minimized over the labeled patches utilizing a least squares solution Under the following constraints:

(a) The node common to all the intersecting triangles must have one motion vector; and (b) Each node point common to adjoining triangles must have one and the same motion vector.

The least squares solution yields an equation of the form $\underline{H}\cdot\underline{a}=\underline{0}$, where 0 is a vector (shown by the underlying dashes) whose elements are zero, and where H is the following matrix:

$$
H=\begin{array}{l}
1st\\ 2nd\\ 3rd\\ \cdot\\ \cdot\\ \cdot\\ \cdot\\ N\text{-}2\\ N\text{-}2
\end{array}
\left[\begin{array}{ccccccc|cccccccc}
 & & & & & & \text{(2N-1)th COLUMN} & \text{2Nth COLUMN} & & & & & \text{3Nth COLUMN} & & \\
x_1 & y_1 & -x_1 & -y_1 & \cdot & \cdot & \cdot & 0 & 1 & -1 & \cdot & \cdot & \cdot & \cdot & \\
x_0 & y_0 & -x_0 & -y_0 & \cdot & \cdot & \cdot & 0 & 1 & -1 & \cdot & \cdot & \cdot & \cdot & \\
0 & 0 & x_2 & y_2 & -x_2 & y_2 & \cdot & 0 & 0 & 1 & -1 & \cdot & \cdot & \cdot & \\
 & & & & & & & & & & & & & & \\
 & & & & & & & & & & & & & & \\
 & & & & & & & & & & & & & & \\
\cdot & \cdot & \cdot & \cdot & x_{N-1} & y_{N-1} & -x_{N-1} & -y_{N-1} & \cdot & \cdot & \cdot & \cdot & 1 & -1 & \\
\cdot & \cdot & \cdot & \cdot & x_0 & y_0 & -x_0 & -y_0 & \cdot & \cdot & \cdot & \cdot & 1 & -1 & \\
-x_N & -y_N & \cdot & \cdot & \cdot & \cdot & x_N & y_N & -1 & \cdot & \cdot & \cdot & \cdot & 1 &
\end{array}\right]
$$

where:

unspecified elements are zero, and a is $$
a=\begin{bmatrix}
a_{11}\\ a_{12}\\ a_{21}\\ a_{22}\\ a_{31}\\ a_{32}\\ \cdot\\ \cdot\\ \cdot\\ a_{(N-1)1}\\ a_{(N2-1)2}\\ a_{N1}\\ a_{N2}\\ a_{13}\\ a_{23}\\ \cdot\\ \cdot\\ \cdot\\ a_{(N-1)3}\\ a_{N3}
\end{bmatrix}
$$

where ($a_{i1}$, $a_{i2}$, $a_{i3}$, $a_{i4}$, $a_{i5}$, $a_{i6}$) are the affine parameters associated with an ith triangle. The first 3 affine parameters ($a_{i1}$, $a_{i2}$, $a_{i3}$) are decoupled from the last 3 affine parameters ($a_{i4}$, $a_{i5}$, $a_{i6}$), therefore only the matrix equation governing the first 3 affine parameters of each triangle of the polygon is used.

The above homogenous equation $\underline{H}\cdot\underline{a}=0$ can be put into the form, $$\tilde{H}\cdot\tilde{a}=\tilde{b}$$

by setting (N+1) of the unknown parameters free, and solving for (2N−1) parameters. In the last equation, $$\tilde{H}$$

is a matrix whose elements are functions of pixel locations and DMV within labeled patches, and can be determined from matrix $\underline{H}$ in $\underline{H}\cdot\underline{a}=\underline{0}$ by means of matrix algebra. N is a vector consisting of first (2N−1) elements of vector $\underline{a}$.

The unknown dependent affine parameter vector, $\tilde{a}$ is uniquely determined under the constraint that the number of pixels used to form the matrix, H, is greater than the number of labeled patches by a least squares solution.

In FIG. 8, there is provided a schematic view of an identified failure region (MF and UB) as a polygon having node points L', M', and N' which is shown enclosed by an enclosing rectangle comprising an array of pixels of the original, uncompressed second image frame, with the enclosing rectangle further shown to be partitioned into 8×8 blocks of pixels. The partitioning of the enclosing rectangles into 8×8 sub-array blocks will be described in further detail hereinafter.

A bit budget establishment member 70 is used to establish a bit budget for the data to be transmitted at a constant data bit rate by the sending unit 1 over the data link 3 to the receiving unit 2 (see FIG. 1). Briefly described, the bit budget establishment member 70 functions as follows: the constant data bit rate for transmission of data is predetermined, for example, a data bit rate of 20 kbits/second. As will be described in more detail hereinafter, the data to be transmitted at that constant data bit rate for the second frame include data representing the node point motion vectors of the estimated or synthesized second image frame, and the identified failure regions and their locations. Accordingly, the bit budget establishment member 70 computes the difference between the number of bits required to achieve the desired constant data bit rate transmission and the sum of the bits corresponding to node point motion vectors and failure regions. Stated differently, the bit budget establishment member 70 computes the number of bits that can be used to code the failure regions.

A second failure region identification member 65 has as one of its inputs a failure-identifying threshold level TR which serves as a threshold level to identify (MF and UB) regions in which a revised selected fraction of all pixels within this region have an absolute difference of pixel signal levels in excess of the threshold level TR relative to pixels in a corresponding region of the uncompressed second image frame. The threshold level TR is selected to better approximate the desired constant data bit rate of the data to be transmitted. The output of the member 65 is such that each MF and UB region is approximated by a polygon.

A failure region coding member 100 is used to assign a designation to each of the MF and UB regions and to code them.

Figure 11:
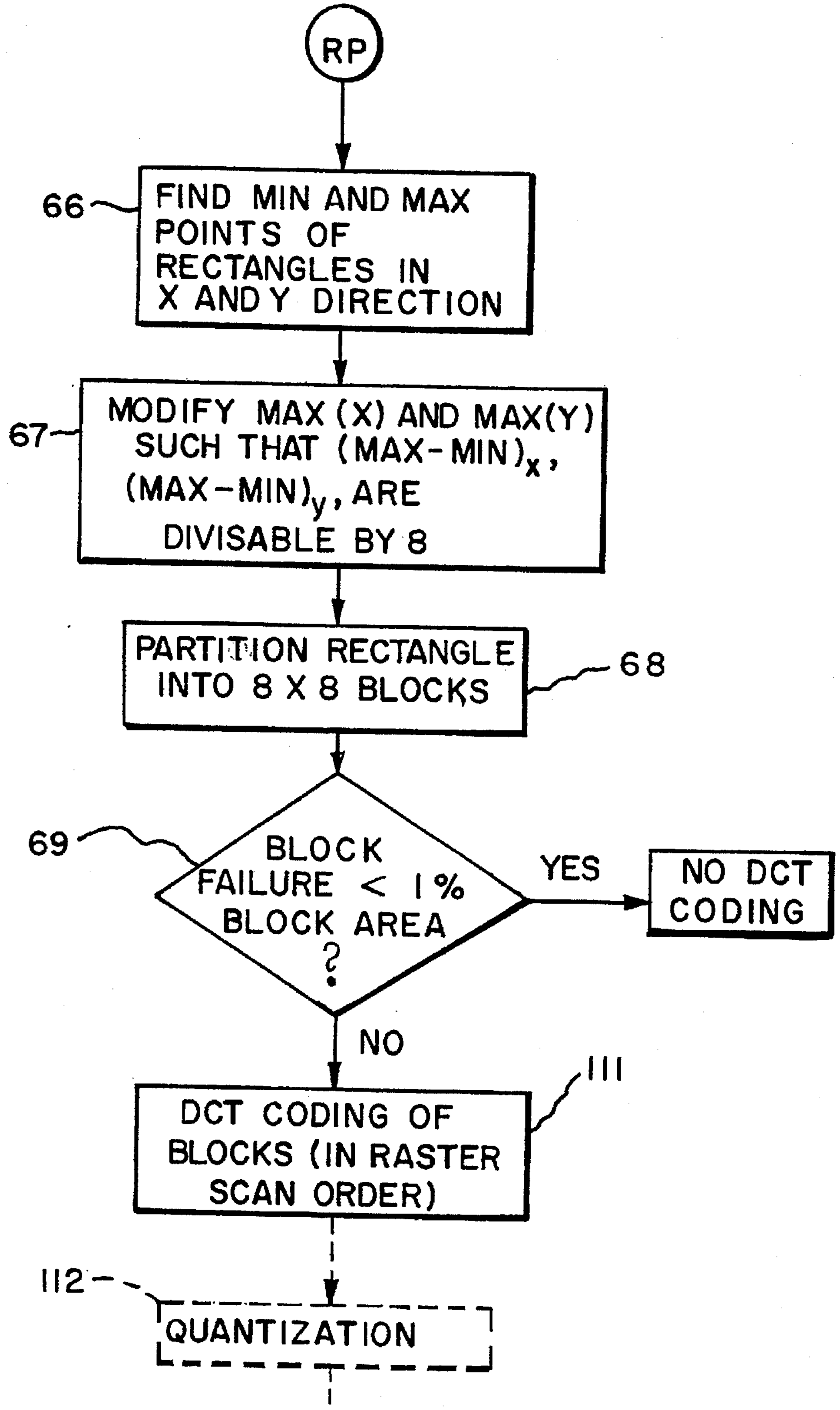
FIG. 11 is a schematic block diagram indicating in greater detail the elements for partitioning the enclosing rectangle for each failure patch shown in FIG. 10.

A rectangular coordinate array of pixels of the uncompressed second image frame is determined as an enclosing rectangle for each of the MF and UB regions, and each enclosing rectangle is partitioned into 8×8 blocks of adjoining sub-arrays. Such partitioning may be performed by scanning one such 8×8 block across the enclosing rectangle, starting in an upper left corner thereof and ending in a lower right corner thereof, as indicated in FIG. 8. Regarding the partitioning of the enclosing rectangles into 8×8 blocks of adjoining sub-arrays of pixels, a more detailed flow chart is shown in FIG. 11 where an input to a first element 66 is reflective of the MF and UB regions (RP). In element 66 the minimum and maximum points of the enclosing rectangles are found in both the x and y directions. In an element 67 the maximum points in the x-direction and the maximum points in the y-direction are modified such that $(\max-\min)_x$ and $(\max-\min)_y$ are divisible by 8. Finally, in a partition element 68 each of the enclosing rectangles is partitioned into 8×8 blocks of adjoining sub-arrays. The output of partition element 68 is directed to a decision element 69, wherein it is decided whether a failure region within an 8×8 block is smaller than one percent (1%) of the block area. If the block failure within an 8×8 block is smaller than 1% of the block area, this particular block will not be coded for transmission. If, however, the block failure within an 8×8 block is larger than 1% of the block area, the decision element 69 outputs such blocks to a failure region coding member 111 for coding by a Discrete Cosine Transform (DCT) coding method known to those skilled in the art of signal coding.

Referring again to FIG. 2A, a failure region (MF and UB) coding member 100 has at one input thereof the pixels of the original temporally second image frame, and at another input thereof the output of the failure region revision member 65. One output of the failure region coding member 100 represents data corresponding to the 8×8 blocks of sub-arrays designated for DCT coding by the decision element 69 of FIG. 11. Another output of the failure region coding member 100 includes the failure region designations which are not subjected to DCT coding.

An entropy coding member 120 is used to provide entropy coding of the previously DCT coded 8×8 blocks of sub-arrays as well as of the failure region designations. A more detailed description of the known DCT and entropy coding methods, as well as on a quantization of data bits, can be found in a publication by Gregory C. Wallace, titled "The JPEG Still Picture Compression Standard," *Communications of the ACM*, vol. 34, no. 4, pp. 31–44, 1991.

A signal transmission member 130 accepts at an input thereof all of the data to be transmitted (not shown in FIG. 2) for transmission via the data link 3 to the receiving unit 2 in accordance with a communication standard. Upon transmission of the coded signals as a coded bit stream to the data link 3 of at least the first image frame and such a plurality of successive image frames for which the first frame is judged by the decision element 61 to be the reference frame rather than a new first frame, the processing of data in the data compression and coding system 10 may be stopped by actuating a stop element 212, thereby concluding the data processing, coding, and transmission of data corresponding to a temporal sequence of image frames.

Figure 9:
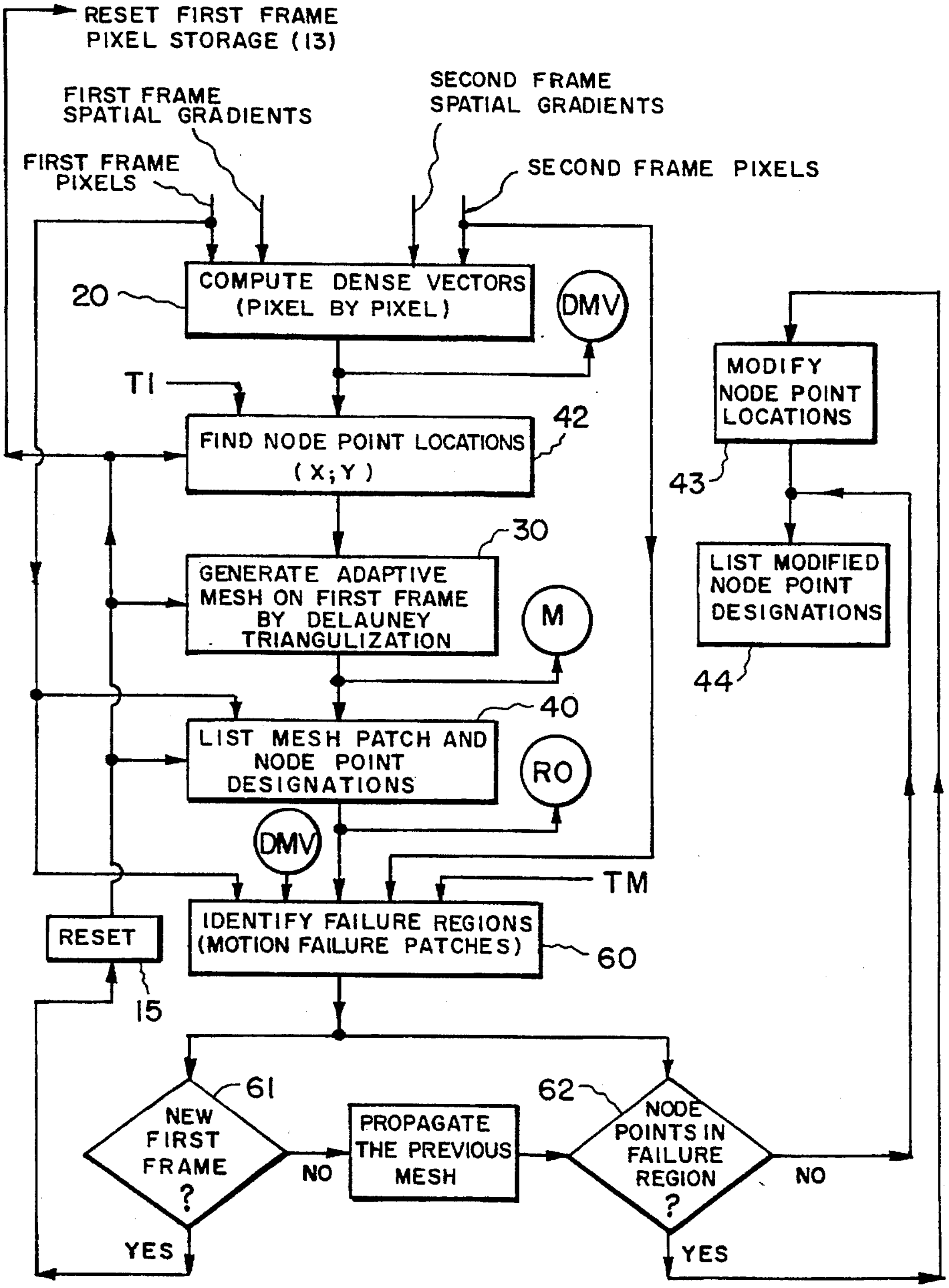
FIG. 9 is a schematic block diagram showing in greater detail some aspects of the identification of the failure regions and the decision elements pertaining to designation of a new first frame and to the location of node points in the failure regions.

Referring now to FIG. 9, there is shown a schematic block diagram indicating in greater detail some aspects of the failure region identification and of decision elements pertaining to the designation of a new first frame, as well as to the location of node points within identified failure regions. Members and elements previously discussed in conjunction with the description of FIG. 2 will not be further described here.

A node point location computing member 42 has attached thereto a reset member 15 which is actuated to reset the members 30, 40 and 42 to generate a new mesh for any new first frame whenever a new first frame decision element 61 renders a decision that the estimated or synthesized second image frame constitutes a new first image frame if a fraction of an allowable number of failure regions is higher than a preset upper limit value. Such a decision, in turn, can be triggered by the failure region identification member 60 which has elements for setting that upper limit value for an allowable number of failure regions expressed as a fraction of all pixels within the data compressed estimated or synthesized second image frame, and also including elements for detecting the fraction of allowable number of failure regions. If the allowable number of pixels in failure regions is lower than the upper limit value, the decision element 61 renders a decision that the estimated second image frame is not a new first frame, propagates the previous mesh, and directs the latter decision to another decision element 62 which decides whether node points of the triangular patches are located within a failure region (BTBC, MF and UB). If decision element 62 renders a decision that node points are located within failure regions, that decision is inputted to a node point location modifying member 43 in which the location of node points is modified by moving the location of such node points to a nearest pixel location outside (the boundary) of a failure region (BTBC), generating new points in MF and UB. If decision element 62 cannot identify node points within the failure regions, this decision is directed together with the output of the node point location modifying member 43 to an input of a modified node point listing member 44 in which a modified listing of node point coordinate designations is generated.

As indicated previously, in the practice of the present invention the node point locations are actually determined in a node point designation member 42 prior to generating the adaptive mesh overlay in the mesh generation member 30. It is to be understood that the term "prior to" can represent a time period as short as a fraction of a nanosecond at the real-time frame-rate processing of data.

Also indicated in FIG. 9 are signal outputs A corresponding to the temporarily stored first frame pixels, DMV corresponding to the dense motion vectors, and M corresponding to the adaptive mesh patches.

Figure 10:
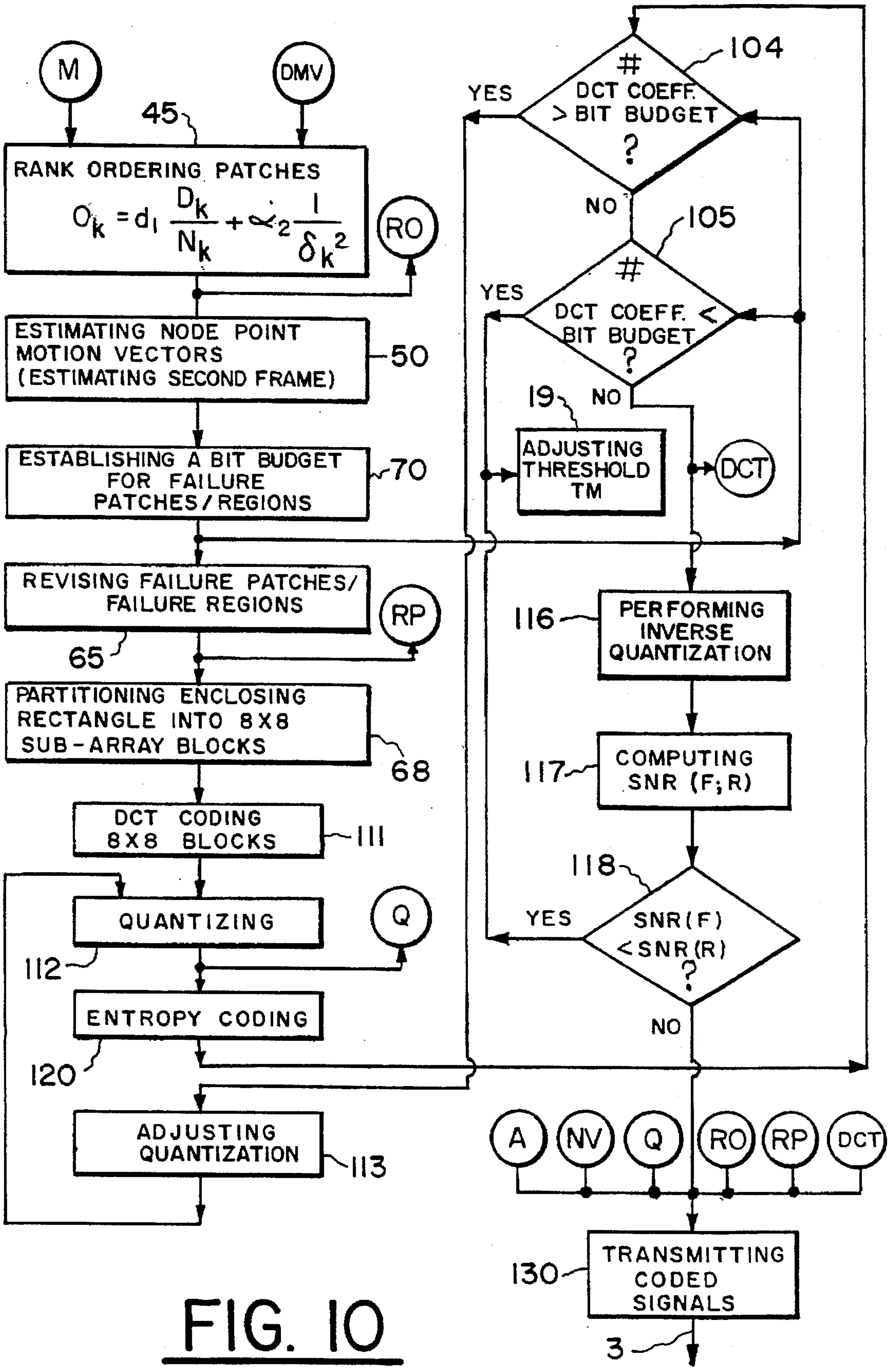
FIG. 10 is a schematic diagram showing in greater detail the rank ordering of triangular patches in accordance with a rank ordering constraint, elements or members for data coding and data quantizing, bit-budget decision elements, a threshold-adjusting element, and a signal-to-noise decision element in accordance with further objects of the present invention.

Referring now particularly to FIG. 10, there is shown a schematic diagram depicting in greater detail the rank ordering of triangular patches in accordance with a rank ordering constraint, elements or members for data coding and data quantizing, bit budget decision elements, a first frame threshold adjusting member, a signal-to-noise decision element, an inverse quantization member, and a signal-to-noise computing member.

A patch rank ordering member 45 has one input M reflective of the triangular mesh patches of the adaptive mesh overlay derived from the output of the mesh generation member 30 (see FIGS. 2A and 9). Another input to the patch rank ordering member 45 are the dense motion vectors DMV obtained at the output of the dense motion vectors determining member 20 in FIG. 2A. The patch rank ordering member 45 rank orders the priority of patch processing in accordance with the relationship discussed previously. The output of the patch rank ordering member 45 is an input to the node point motion vector estimation member 50, and this output is also provided as an RO output.

An enclosing rectangle partitioning member 68 as shown here includes the block failure decision element 69 depicted in FIG. 11, and it is assumed for illustrative purposes that element 69 has rendered a decision to subject all 8×8 blocks of adjoining sub-regions to DCT coding in a DCT coding member 111. The DCT coded 8×8 blocks comprising the enclosing rectangle of second frame pixels around each failure region, are then quantized in a quantizing member 112.

The quantizing member 112 provides an output Q which is representative of quantized DCT parameters or coefficients. The output of the quantizing member 112 is also provided as one input of a decision element 104 which has as another input the bit budget allocated to the failure patches or failure regions by the bit budget establishment member 70. Decision element 104 essentially provides an upper limit value of the allocated bit budget. If the number of bits to code the DCT coefficients is higher than the allocated bit budget, the decision element 104 renders a decision which leads to an adjustment of the quantization in a quantization adjusting member 113, whose output is provided at another input of the quantizing member 112 to modify the quantization of the DCT coded 8×8 blocks.

If the number of DCT coefficients is not higher than the allocated bit budget, decision element 104 provides an output which is inputted to a decision element 105 at one input thereof, a second input thereof being the aforementioned allocated bit budget. Decision element 105 essentially provides a lower limit value for the number of bits required to code the DCT coefficients. If the number is lower than the bit budget allocation, decision element 105 will render a decision to adjust the threshold level Tm for the next frame failure region determining member 60 (see FIG. 2). If the number is not lower than the allocated bit budget, decision element 105 will generate an output reflective of that selected number of DCT coefficients which is required to achieve the constant bit rate of the data to be transmitted.

This output of decision element 105 is also provided at an input of an inverse quantization performing member 116 whose output is connected to an input of a signal-to-noise computing member 117 in which a signal-to-noise ratio (SNR) is computed for both the failure regions (F) and the remaining regions (R). These computed SNR values are directed to a decision element 118 which renders a decision as to whether or not the SNR of the failure regions is lower than the SNR of the remaining regions. If SNR (F) is lower than SNR (R), one output of decision element 118 is provided at the input of the first frame threshold adjusting member 19. If the SNR (F) is not lower than the SNR (R), another output of the decision element 118 is directed to a transmitting member 119 for transmitting coded signals to the receiving unit 2 via the data link 3.

The SNR computing member 117 includes an element for ascertaining an overall signal-to-noise ratio of the data compression system in accordance with the following relationship:

$$PSNR = 10\log_{10}\frac{255^2}{MSD},$$

where

PSNR is the peak signal-to-noise ratio 255 is the maximum number of pixel signal levels representative of spatial image gradients of a scene content MSD is the mean square difference of the estimated and original second frames.

The transmitting member 130 includes the following inputs: (1) The node designations RO provided at the output of the node point and mesh patch designation member 40 and coded therein by an element (not shown) which generates a binary code of the node designations which is representative of each one of the designations, including the node designations of the failure regions (BTBC). The binary coded node designations are also entropy-coded. (2) All first frame pixels, designated as signal A (or if a new frame has to be transmitted), which are converted into binary coded signal levels by a first frame pixel coding element (not shown), followed by entropy coding of these binary coded first frame pixel signal levels. (3) The node point motion vectors NV whose coordinates are converted to a binary code by an element (not shown) followed by entropy coding of the binary coded node point motion vector coordinates. The coding of the node point motion vectors is constrained by a requirement for predicting the value and direction of a node point motion vector at each node point on the basis of node point vectors having respective correspondence to an immediate predecessor node point motion vector and to node point motion vectors of spatially closest neighbor node points. (4) The quantization levels Q, obtained at the output of the quantizing member 112. (5) The entropy coded DCT coefficients. (6) The designations of the failure regions (MF and UB).

From the foregoing description of the preferred embodiment, it will be apparent that a data compression system and method have been provided for compressing digitized video signals of temporally later image frames, such as at least a temporally second frame, into a data-compressed estimated or synthesized image frame in response to a dense motion field (DMV). A shape-adaptive triangular patch mesh model overlay is provided on a predecessor image frame, for example, a first image frame such that the location of node points of each triangular patch is determined by the spatial image gradients of the predecessor image frame and the displaced frame difference (DFD). The shape-adaptive patches are shape-adapted by motion of the node points in response to the dense motion field among the successive frames. Such node point motion; expressed as node point motion vectors, represents an estimate of the scene content difference, within a triangular patch, of the scene contents of each of the successive image frames with respect to the predecessor or first frame, wherein all node point vectors together represent a data-compressed estimated or synthesized later image frame. The node point motion is estimated by an application of a linear least-squares solution to an affine transformation of the mesh overlay on the first or predecessor frame into the estimated or synthesized data-compressed later or at least second frame.

The data compression system includes means for rank ordering the processing priority among the shape-adapted triangular patches, means for identifying failure regions, means for identifying the failure regions in accordance with a bit budget allocated to failure regions, and means for coding of all data to be transmitted at a constant data bit rate by a sending unit to a receiving unit over a data link.

It will be appreciated that members and elements of the data compression system can be general purpose microprocessors, or they can be customized and dedicated processors. Additionally, the numerous process steps of the video signal data compression system of the invention can be consolidated into suitable blocks of process steps.

While the data compression system of the invention has been described primarily with a view toward data compression of two-dimensional (2-D) digitized video signal image frames, it will be apparent to those skilled in this art that three-dimensional (3-D) object-based approaches using wire frame models can be transformed by an orthographic projection to provide a 2-D mesh overlay model with triangular patches. Such orthographic projection also allows for 3-D motion of a planar patch in 3-D to be described by an affine mapping in two dimensions. Thus, 3-D object-based approaches can be readily incorporated into the practice of the present invention. The aforementioned and other modifications are within the spirit and scope of the invention, as defined in the specification and the claims.

What is claimed is:

1. A data compression system in a sending unit for transmission at a constant data bit rate over a data link in accordance with a communication standard between said sending unit and a receiving unit of data of a temporal sequence of image frames of video signals in which each image frame is represented prior to data compression by a two-dimensional coordinate array of a number of digitized picture elements (pixels) wherein said sequence includes a temporally first image frame and at least a temporally second image frame, and frames having scene contents containing spatial gradients and also having regions displaced corresponding to motion of the scene content, the data compression system comprising:

means for computing a dense motion field of dense motion vectors on a pixel-by-pixel basis representing the values and directions of motion of said scene content of said temporally second image frame with respect to said temporally first image frame;

means for generating a two-dimensional model of a mesh overlay on said first image frame, said mesh model comprising a plurality of interconnected shape-adaptive triangular patches with each patch having node points with respectively associated node point coordinates, each of said patches being defined on said first image frame in accordance with mesh-generating constraints and spatial gradients and displaced frame differences;

means for assigning a designation to each one of said triangular patches in accordance with a patch-assigning constraint and to each one of the node points associated therewith;

means for estimating and thereby parameterizing the motion of each one of said node points of said triangular patches overlaid on said first image frame in response to said dense motion vectors, said node point motion being estimated in accordance with motion-estimating constraints by an application of a statistical solution to an affine transformation of said first image frame, whereby said dense motion vectors are data-compressed into estimated node point motion vectors having second coordinates associated therewith and wherein all estimated node point motion vectors together comprise a representation of a data-compressed estimated second image frame;

means for identifying failure regions (MF and UB) in said data-compressed estimated second image frame wherein a difference is computed between the pixel signal levels of the uncompressed second image frame and the data-compressed estimated second image frame in accordance with certain ones of failure-identifying constraints, whereby each failure region is defined as such rectangular coordinate array of pixels of said uncompressed second image frame which encloses the pixels within a failure region identified in said temporally second image frame;

means for establishing a bit budget for the data to be transmitted at said constant data bit rate by said sending unit to said receiving unit;

means for revising the failure regions defined by said failure regions identifying means in accordance with a revised failure-identifying constraint;

means for assigning a designation to each one of said failure regions and alternatively to each one of said revised failure regions;

means for coding the node designations of each one of said triangular patches of said mesh overlay model;

means for coding the pixel signal levels of pixels within each one of said rectangular coordinate array failure regions;

means for coding the node point motion vectors of said data-compressed estimated second image frame;

means for coding the pixel signal levels of all pixels of said temporally first image frame when said first frame is an original or new first frame; and;

means for transmitting at a constant data bit rate from said sending unit over said data link to said receiving unit said coded pixel signal levels of said first image frame, said coded node point motion vectors, said coded pixel signal levels corresponding to said failure regions, and said coded node designations in accordance with said communication standard.

2. The data compression system of claim 1 wherein said statistical solution is a linear least squares solution.

3. The data compression system of claim 1, wherein said dense motion vector computing means comprises:

means using a 2-D motion field estimation algorithm to obtain said dense motion vectors for each pixel location.

4. The system of claim 1 further comprising means for decoding in said receiving unit said coded signals transmitted from said sending unit to form a temporal sequence of image frames of video signals for display, said sequence including at least said first and second image frames.

5. The data compression system of claim 1, wherein said mesh generating means comprises:

means for selecting a mesh-generating threshold level in accordance with one of said mesh-generating constraints, said coordinates of said node points of said triangular patches on said first image frame being defined by values of said spatial gradients exceeding said selected threshold level, and said displaced frame differences;

means for selecting a minimum coordinate distance which defines a closest distance between neighboring node points in accordance with another one of said mesh-generating constraints, said minimum coordinate distance being selected on the basis of said number of pixels contained in said two-dimensional coordinate array of pixels; and means for identifying failure regions in said first frame and detecting the location of each one of said node points such that it does not fall within said failure regions.

6. The data compression system of claim 5, wherein said node point location detecting means further comprises:

means for modifying the location of node points detected to be located within a failure region.

7. The data compression system of claim 6, wherein said location modifying means comprises:

means for moving the location of said node points to a nearest pixel location outside of a BTBC failure region; and means for generating new node points in MF and UB regions.

8. The data compression system of claim 1 further comprising:

means for obtaining the triangular patches using a Delauney triangulization algorithm; and means for refining the patches using a split-and-merge algorithm.

9. The data compression system of claim 1, wherein said patch designation assigning means comprises:

means for rank ordering said triangular patches on the basis of the values and directions of said dense motion vectors obtained from said computing means and located within each patch in accordance with the following relationship, $$O_k = \alpha_1 \frac{D_k}{N_k} + \alpha_2 \frac{1}{\sigma^2_{k}},$$

where $O_k$ is the rank order of a patch k $\alpha_1$, $\alpha_2$ are positive scalars selected such that $$\alpha_1 \frac{D_k}{N_k}$$

and $$\alpha_2 \frac{1}{\sigma^2_k}$$

are of the same order, $$D_k$$

is the displaced region difference (DRD) within a patch k, $$N_k$$

is the total number of pixels within a patch k, $$\sigma_k^2$$

is the variance among the pixel signal levels within a patch k wherein patches having the highest variance are assigned the highest rank and correspondingly highest priority for processing by said motion estimating means in accordance with at least one of said patch-assigning constraints, and said means for rank ordering using a function of $$D_k,$$

$N_k$, and $$\sigma_k^2.$$

10. The data compression system of claim 1, wherein said motion estimating means comprises:

means for deriving the motion of each pixel within a triangular patch overlaid on said temporally first image frame to new coordinate locations in said estimated second image frame in accordance with the following relationships, $$\tilde{u}_j = \tilde{x}'_j - x_j = (a_{i1} - 1)x_j + a_{i2}y_j + a_{i3}$$

$$\tilde{v}_j = \tilde{y}'_j - y_j = a_{i4}x_j + (a_{i5} - 1)y_j + a_{i6}$$

where $x_j$, $y_j$ are the coordinates of a pixel, j, within a patch i of the first image frame, $\tilde{x}_j$, $\tilde{y}'_j$ are the estimated coordinates of a matching pixel within the patch i of the estimated second image frame, $\tilde{u}_j$, $\tilde{v}_j$ are the estimated parametric vectors of the pixel j, $a_{i1}, \ldots a_{i6}$ are affine parameters for patch i, and wherein $\tilde{u}_j = (\tilde{x}'_j - x_j)$ and $\tilde{v}_j = (\tilde{y}'_j - y_j)$ are flow constraints or estimates in accordance with said motion-estimating constraints;

means for determining an estimate of said node point motion vectors of the three node points of an ith triangular patch overlaid on said first image frame, in accordance with the following relationship, $$\sum_{j=1}^{N_i} (\tilde{u}_j - u_j)^2 + (\tilde{v}_j - v_j)^2$$

where $N_i$ is the number of estimated dense motion vectors within the first triangular patch, the relationship being minimized with respect to the affine parameters $a_{i1}, \ldots, a_{i6}$ by an application of said solution in accordance with the following relationship, $$\begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ & & . & & & \\ & & . & & & \\ & & . & & & \\ x_{Ni} & y_{Ni} & 1 & 0 & 0 & 0 \\ 0 & 0 & 0 & x_{Ni} & y_{Ni} & 1 \end{bmatrix} \begin{bmatrix} a_i \\ a_{i2} \\ a_{i3} \\ a_{i4} \\ a_{i5} \\ a_{i6} \end{bmatrix} = \begin{bmatrix} x_1' \\ y_1' \\ x_2' \\ y_1' \\ . \\ . \\ . \\ x_{Ni}' \\ y_{Ni}' \end{bmatrix}$$

where $x_1, \ldots, x_{Ni}$ and $y_1, \ldots, y_{Ni}$ are the respective starting coordinates of all $N_i$ dense motion vectors within the first triangular patch of the first image frame where $x'_1, \ldots, x'_{Ni}$, and $y'_1, \ldots, y'_{Ni}$ are the respective ending coordinates of all $N_i$ dense motion vectors within the first patch of the estimated second image frame $a_{i1}, \ldots, a_{i6}$ are the affine parameters, and wherein the node point motion vectors of said three node points are included therein and can be extracted therefrom.

11. The data compression system of claim 10, wherein said motion estimating means further comprises alternative means for determining said estimate for said three node points of said ith triangular patch overlaid on said first image frame, in accordance with the following relationship, $$\sum_{j=1}^{N_i} (I_x\tilde{u}_j + I_y\tilde{v}_j + I_t)^2$$

where $N_i$ is the number of pixels within said ith triangular patch of said first image frame where $I_x$, $I_y$ are the spatial image gradients in respective x and y directions of said $N_i$ pixels within said ith patch of said first image frame where $I_t$ is a temporal gradient within the ith patch of the first image frame, said relationship being minimized with respect to said affine parameters $a_{i1}, \ldots, a_{i6}$ in terms of spatio-temporal image gradients and node point coordinates by said application of said solution to determine said estimate of said node point motion vectors.

12. The data compression system of claim 10, wherein said motion estimating means further comprises:

means for preserving the connectivity among said plurality of interconnected shape-adaptive triangular patches of said mesh overlay model, wherein each node point common to adjoining triangular patches has one and the same node point motion vector in accordance with another one of said motion-estimating constraints, and wherein said means for preserving the connectivity uses a polygonal boundary constraint.

13. The data compression system of claim 11 wherein said motion estimating means further comprises:

means for preserving the connectivity among said plurality of interconnected shape-adaptive triangular patches of said mesh overlay model, wherein each node point common to adjoining triangular patches has one and the same node point motion vector in accordance with another one of said motion-estimating constraints, and wherein said means for preserving the connectivity uses a polyogonal boundary constraint.

14. The data compression system of claim 1, wherein said bit budget establishing means comprises:

means for counting as data bits the node point motion vectors; and means for calculating a data bit rate fraction corresponding to said counted data bits, said fraction being calculated with respect to said constant data bit rate of the data to be transmitted.

15. The data compression system of claim 1, wherein said mesh-generating constraints include exclusion of failure regions (BTBC) in said first image frame which are identified by said dense motion vectors.

16. The data compression system of claim 15, wherein said MF and UB failure regions are in said second image frame.

17. The data compression system of claim 16, wherein said failure regions identifying means comprises:

means for selecting a first failure-identifying threshold level in accordance with said failure-identifying constraints, said failure regions (BTBC) being identified as regions where an absolute difference of pixel signal levels between the original and the coded first image frame is in excess of said first threshold level; and means for selecting a second failure-identifying threshold level in accordance with said failure-identifying constraints, said MF and said UB being identified as a region where an absolute difference of pixel signals between the original uncompressed second image frame and said estimated second range is in excess of said second threshold level.

18. The data compression system of claim 17, wherein said failure region revising means comprises:

adaptive thresholding means for selecting a revised failure-identifying threshold level in accordance with a revised failure-identifying constraint, wherein said revised threshold is selected to approximate said constant data bit rate of the data to be transmitted from said sending unit to said receiving unit.

19. The data compression system of claim 18, wherein said failure region designation assigning means comprises:

means for determining the coordinates of a rectangular coordinate array of pixels of the uncompressed second image frame which encloses the pixels within said failure region identified in a corresponding polygonal patch overlaid on said estimated second image frame; and means for partitioning said rectangular coordinate array into adjoining sub-array blocks.

20. The data compression system of claim 19, wherein said failure region pixel coding means comprises:

means for forming a discrete cosine transform (DCT) of the pixel signal levels of the pixels within each of said sub-array blocks, whereby DCT coefficients are obtained for each sub-array block;

means for quantizing said DCT coefficients;

means for determining by an entropy-determining means such number of DCT coefficients as are required to achieve said constant data bit rate of the data to be transmitted from said sending unit to said receiving unit;

means for selecting said required number of DCT coefficients;

means for performing an inverse quantization of said selected required number of DCT coefficients; and means for computing a signal-to-noise ratio of said DCT coefficients of said failure regions.

21. The date compression system of claim 20, wherein said determining means further comprises:

means for detecting an upper and a lower limit value for a number of bits required to code the DCT coefficients;

means for adjusting said quantizing means whenever the number of bits is higher than said upper limit value; and means for changing a next frame failure region threshold level whenever the number of bits is lower than said lower limit value.

22. The date compression system of claim 20, wherein said failure region pixel coding means further comprises:

means for computing a signal-to-noise ratio for the pixels within each one of said failure regions (MF and UB) and each one of the remaining regions;

means for detecting a different of said signal-to-noise between said failure regions and the remaining regions; and means for changing a next frame failure region threshold level whenever said signal-to-noise ratio of said failure regions is lower than said signal-to-noise ratio of the remaining regions.

23. The data compression system of claim 18, wherein said failure region identifying means and alternatively said failure region revising means further comprises:

means for setting an upper limit value for an allowable number of failure regions as a fraction of all regions within said data-compressed estimated second image frame;

means for detecting said fraction of said allowable number of failure regions;

means for deciding that said estimated second image frame constitutes a new first image frame whenever said fraction of said allowable number of failure regions is higher than said upper limit value; and means for resetting said node point estimating means, said mesh-generating means, and said patch designation assigning means to generate a new mesh for a new first image frame.

24. The data compression system of claim 1, wherein said node designation coding means comprises:

means for generating a binary code representative of each one of said node designations, including said node designations of said failure regions; and means for entropy-coding said binary code node designations.

25. The data compression system of claim 1, wherein said note point motion vector coding means comprises:

means for predicting the value and direction of a node point motion vector at each node point on the basis of node point vectors having respective correspondence to an immediate predecessor node point motion vector and to node point motion vectors of spatially closest neighbor node points;

means for converting into a binary code the coordinates of said node point motion vector at each node point; and means for entropy-coding said binary coded vector coordinates.

26. The data compression system of claim 1, wherein said first image frame pixel signal coding means comprises:

means for converting into a binary code the pixel signal levels of all pixels of said temporally first image frame; and means for entropy-coding said binary coded pixel signal levels.

27. The data compression system of claim 1, wherein said bit budget establishing means comprises:

means for ascertaining an overall signal-to-noise ratio of the data compression system in accordance with the following relationship, $$PSNR = 10\log_{10}\frac{255^2}{MSD}$$

where

PSNR is the peak signal-to-noise ratio 255 is the maximum number of pixel signal levels representative of spatial image gradients of a scene content MSD is the mean square difference of the estimated and original second frames.

28. The data compression system according to claim 1, wherein said pixels in each array has associated pixel signal levels corresponding to the contents of the scenes depicted by each of said frames, and wherein said sequence includes a temporally first frame and a temporally second frame having at least one pixel region displaced in correspondence with the motion of said scene content with respect to an identical pixel region of said first frame and further comprising:

means for storing temporarily the pixel signal levels of said first frame, means for determining the values and coordinate locations of said spatial gradients on a pixel-by-pixel basis within said first and second frames, and wherein said computing means further comprises means for computing the different between the pixel values of the spatial gradients at identical coordinate locations within said frames whereby to provide said dense motion vectors.

29. A method of data compression in a sending unit for transmitting at a constant data bit rate over a data link in accordance with a communication standard between said sending unit and a receiving unit of data of a temporal sequence of image frames of video signals in which each image frame is represented prior to data compression by a two-dimensional coordinate array of a number of digitized picture elements (pixels) having associated pixel signal levels corresponding to a scene content containing spatial gradients and wherein said sequence includes a temporally first image frame and at least a temporally second image frame having at least one pixel region displaced in correspondence with motion of said scene content with respect to an identical pixel region of said first image frame, the data compression method comprising the steps of:

storing temporarily in a storing means the pixel signal levels of said first image frame;

determining the values and the coordinate locations of said spatial gradients on a pixel-by-pixel basis within said first and second image frames;

computing a dense motion field of dense motion vectors on a pixel-by-pixel basis representing the values and directions of motion of said scene content of aid temporally second image frame with respect to said temporally first image frame;

generating a two-dimensional model of a mesh overlay on said first image frame, said mesh model comprising a plurality of interconnected shape-adaptive triangular patches with each patch having node points with respectively associated node point coordinates, each of said patches being defined on said first image frame in accordance with mesh-generating constraints in response to said spatial gradients and displaced region differences;

assigning a designation to each one of said shape-adapted triangular patches in accordance with the patch-assigning constraint and to each one of the node points associated therewith;

estimating and thereby parameterizing the motion of each one of said node points of said triangular patches overlaid on said first image frame in response to said dense motion vectors, said note point motion being estimated in accordance with motion-estimating constraints by an application of a statistical solution to an affine transformation of said first image format, whereby said dense motion vectors are data-compressed into estimated note point motion vectors having second coordinates associated therewith and wherein all estimated node point motion vectors together comprise a representation of a data-compressed estimated second image frame;

identifying failure regions in said data-compressed estimated second image frame wherein a difference is computed between the pixel signal levels of a temporarily stored uncompressed second image frame and said data-compressed estimated second image frame in accordance with a failure-identifying constraint, whereby each failure region is defined as such rectangular coordinate array of pixels of the uncompressed second image frame which encloses the pixels within a failure region identified in said temporally second image frame;

establishing a bit budget for the data to be transmitted at said constant data bit rate by said sending unit to said receiving unit;

revising the failure regions defined in said failure regions identifying step in accordance with a revised failure-identifying constraint;

assigning a designation to each one of said failure regions and alternatively to each one of said revised failure regions;

coding the node designations of each one of said triangular patches of said mesh overlay model;

coding the pixel signal levels of pixels within each one of the rectangular coordinate array failure revised failure regions;

coding the node point motion vectors of said data-compressed estimated second image frame;

coding the pixel signal levels of all pixels of said temporally first image frame when said first frame is an original or a new first frame; and transmitting at a constant data bit rate from said sending unit over said data link to said receiving unit said coded pixel signal levels of said first image frame, said coded node point motion vectors, the coded pixel signal levels corresponding to said failure regions and said coded node designations in accordance with said communication standard.

30. The data compression method of claim 29, wherein said dense motion vector computing step comprises:

selecting a two-dimensional (2-D) motion field estimation algorithm to obtain dense motion vectors for each pixel location.

31. The data compression method of claim 30, wherein said mesh-generating step comprises:

selecting a mesh-generating threshold level in accordance with one of said mesh-generating constraints, said coordinates of said node points of said triangular patches on said first image frame being defined by values of said spatial gradients in excess of said selected mesh-generating threshold level, and by said displaced region differences;

selecting a minimum coordinate distance which defines a closest distance between neighboring node points in accordance with another one of said mesh-generating constraints, said minimum coordinate distance selected on the basis of said number of pixels contained in said two-dimensional coordinate array of pixels;

identifying failure regions in said first image frame; and selecting the location of each one of said node points such that each node point is located outside each one of said failure regions.

32. The data compression method of claim 31, wherein said patch designation assigning step comprises:

rank ordering said triangular patches on the basis of the values and directions of said dense motion vectors obtained from said dense motion field computing step and located within each patch in accordance with the following relationship, $$O_k = \alpha_1 \frac{D_k}{N_k} + \alpha_2 \frac{1}{\sigma 2_{k\bullet}} ,$$

where $O_k$ is the rank order of a patch k $\alpha_1$, $\alpha_2$ are positive scalars selected such that $$\alpha_1 \frac{D_k}{N_k}$$

and $$\alpha_2 \frac{1}{\sigma 2_k}$$

are of the same order, $$D_k$$

is the displaced region difference (DRD) within a patch k, $$N_k$$

is the total number of pixels within a patch k, $$\sigma_k^2$$

is the variance among the pixel signal levels within a patch k wherein patches having the highest variance are assigned the highest rank and correspondingly highest priority for processing by said motion estimating means in accordance with the patch-assigning constraint; and rank ordering by a function of $$D_k,$$

$N_k$, and $\sigma_k^2$.

33. The data compression method of claim 32, wherein said motion estimating step comprises:

deriving the motion of each pixel within a triangular patch overlaid on said temporally first image frame to new coordinate locations in said estimated second image frame in accordance with the following relationships, $$\tilde{u}_j=\tilde{x}'_j-x_j=(a_{i1}-1)x_j+a_{i2}y_j+a_{i3}$$

$$\tilde{v}_j=\tilde{y}'_j-y_j=a_{i4}x_j+(a_{i5}-1)y_j+a_{i6},$$

where $x_j$, $y_j$ are the coordinates of a pixel, j, within a patch i of the first image frame, $\tilde{x}'_j$, $\tilde{y}'_j$ are the estimated coordinates of a matching pixel within the patch i of the estimated second image frame, $\tilde{u}_j$, $\tilde{v}_j$ are estimated parametric motion vectors of the pixel j;

and $a_{i1}, \ldots a_{i6}$ are affine parameters for patch i, and wherein $\tilde{u}_j=(\tilde{x}'_j-x_j)$ and $\tilde{v}_j=(\tilde{y}'_j-y_j)$ are optical flow constraints or estimates in accordance with one of said motion-estimating constraints;

determining an estimate of said node point motion vectors of the three node points of an ith triangular patch overlaid on said first image frame, in accordance with the following relationship, $$\sum_{j=1}^{N_i} (\tilde{u}_j-u_j)^2+(\tilde{v}_j-v_j)^2$$

where $N_i$ is the number of estimated dense motion vectors within the i-th triangular patch, said relationship being minimized with respect to the affine parameters $a_{i1}, \ldots, a_{i6}$ by an application of a linear least-squares solution in accordance with the following relationship, $$\begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ & & \cdot & & & \\ & & \cdot & & & \\ & & \cdot & & & \\ x_{Ni} & y_{Ni} & 1 & 0 & 0 & 0 \\ 0 & 0 & 0 & x_{Ni} & y_{Ni} & 1 \end{bmatrix} \begin{bmatrix} a_{i1} \\ a_{i2} \\ a_{i3} \\ a_{i4} \\ a_{i5} \\ a_{i6} \end{bmatrix} = \begin{bmatrix} x_1' \\ y_1' \\ x_2' \\ y_1' \\ \cdot \\ \cdot \\ \cdot \\ x_{Ni}' \\ y_{Ni}' \end{bmatrix}$$

where $x_1, \ldots, x_{Ni}$ and $y_1, \ldots, y_{Ni}$ are the respective starting coordinates of all $N_i$ dense motion vectors within the i-th triangular patch of the first image frame $x'_1, \ldots, x'_{Ni}$ and $Y'_1, \ldots, Y'_{Ni}$ are the respective ending coordinates of all $N_i$ dense motion vectors within the i-th patch of the estimated uncompressed second image frame $a_{i1}, \ldots a_{i6}$ are the affine parameters, and wherein the node point motion vectors of the three node points are included therein and can be extracted therefrom.

34. The data compression method of claim 33, wherein said motion estimating step further comprises:

preserving the connectivity among said plurality of interconnected shape-adaptive triangular patches of said mesh overlay model, wherein each node point common to adjoining triangular patches has one and the same node point motion vector in accordance with another one of said motion-estimating constraints; and preserving said connectivity by a polyogonal boundary constraint.

35. The data compression method of claim 29, further comprising the steps of:

obtaining the triangular patches by a Delauney trianguli-zation algorithm; and refining the patches by a split-and-merge algorithm.

36. The data compression method of claim 29, wherein said motion estimating step further comprises an alternative step of determining said estimated node point motion vectors of an ith triangular patch overload on said first image frame, in accordance with the following relationship, $$\sum_{j=1}^{N_i} (I_x\tilde{u}_j+I_y\tilde{v}_j+I_t)^2$$

where $N_i$ is the number of pixels within the i-th triangular patch of said first image frame $I_x$, $I_y$ are the spatial gradients in respective x and y directions of said $N_i$ pixels within the i-th patch of said first image frame $I_t$ is a temporal gradient within the i-th patch of the first image frame, said relationship being minimized with respect to affine parameters $a_{i1}, \ldots, a_{i6}$ by an application of a linear least squares solution to determine said estimated node point motion vectors.

37. The data compression method of claim 36, wherein said motion estimating step further comprises:

preserving the connectivity among said plurality of interconnected shape-adaptive triangular patches of said mesh overlay model, wherein each node point common to adjoining triangular patches has one and the same node point motion vector in accordance with an alternative motion-estimating constraint; and preserving said connectivity by a polyogonal boundary constraint.

38. The data compression method of claim 29, wherein said bit budget establishing step comprises:

counting as data bits the node point motion vectors; and calculating a data bit rate fraction corresponding to said counted data bits, said fraction being calculated with respect to said constant data bit rate of the data to be transmitted.

39. The data compression method of claim 38, further comprising the steps of:

ascertaining an overall signal-to-the ratio of the data compression method in accordance with the following relationship PSNR=10 $\log_{10}(255^2/MSD)$, where PSNR is the peak signal-to-noise ratio 255 is the maximum number of pixel signal levels representative of spatial image gradients of a scene content MSD is the mean square difference of the estimated and original second image frames.

40. The data compression method of claim 29, wherein said failure region revising step comprises:

selecting a revised failure-identifying threshold level in accordance with said revised failure-identifying, wherein said revised threshold is selected to approximate said constant data bit rate of the data to be transmitted from said sending unit to said receiving unit.

41. The data compression method of claim 40, wherein said failure region revising step further comprises:

setting an upper limit value for an allowable number of failure regions as a fraction of all patches within said data-compressed estimated second image frame;

detecting said fraction of said allowable number of failure regions;

deciding that said estimated second image frame constitutes a new first image frame whenever said fraction of said allowable number of failure regions is higher than said upper limit value; and resetting said node point estimating means, said mesh-generating means, and said patch designation assigning means to generate a new mesh for a new first image frame.

42. The data compression method of claim 40, wherein said failure region designation assigning step comprises:

determining the coordinates of a rectangular coordinate array of pixels of the uncompressed second image frame which encloses the pixels within the failure region identified in a corresponding polygonal patch overlaid on said estimated second image frame; and partitioning said rectangular coordinate array into sub-array blocks of adjoining sub-arrays.

43. The data compression method of claim 42, wherein said node designation coding step further comprises:

generating a binary code representative of each one of said node designations, including the node designations of said failure regions; and entropy-coding said binary code node designations.

44. The data compression method of claim 43, wherein the failure region pixel coding step comprises:

forming a discrete cosine transform (DCT) of the pixel signal levels of the pixels within each one of said sub-array blocks of rectangular coordinate arrays, whereby DCT coefficients are obtained for each of said sub-array blocks;

quantizing said DCT coefficients;

determining by an entropy-determining step such number of DCT coefficients as are required to achieve said constant data bit rate of the data to be transmitted from said sending unit to said receiving unit;

selecting said required number of DCT coefficients;

performing an inverse quantization of said selected required number of DCT coefficients; and computing a signal-to-noise ratio of said DCT coefficients of said failure regions.

45. The data compression method of claim 44, wherein said node point motion vector coding step comprises:

predicting the value and direction of a node point motion vector at each node point on the basis of node point vectors having respective correspondence to an immediate predecessor node point motion vector and to node point motion vectors of spatially closest neighbor node points;

converting into a binary code the coordinates of said node point motion vector at each node point; and entropy-coding said binary coded vector coordinates.

46. The data compression method of claim 45, wherein said first image frame pixel signal coding step comprises:

converting into a binary code the pixel signal levels of all pixels of said temporally first image frame; and entropy-coding said binary coded pixel signal levels.

47. The date compression method of claim 44, wherein said determining step further comprises:

detecting an upper and a lower limit value for a number of bits required to code the DCT coefficients;

adjusting said quantizing means whenever the number of bits is higher than said upper limit value; and changing a next frame failure region threshold level whenever the number of bits is lower than said lower limit value.

48. The data compression method of claim 44, wherein the failure region pixel coding step further comprises:

performing an inverse quantization of said selected required number of DCT coefficients;

computing a signal-to-noise ratio for the pixels within each one of said failure regions (MF and UB) and each one of the remaining regions;

detecting a difference of said signal-to-noise ratio between said failure regions and the remaining regions; and changing a next frame failure region threshold level whenever said signal-to-noise ratio of said failure regions is lower than said signal-to-noise ratio of the remaining regions.

49. The data compression method of claim 29, wherein a receiving step in said receiving unit comprises the step of:

decoding the coded signals transmitted from said sending unit to form a temporal sequence of image frames of video signals for display, said sequence including at least said first and second image frames.

50. The data compression method of claim 29, wherein said mesh-generating step further comprises the steps of:

selecting the mesh-generating constraint to include exclusion of failure regions (BTBC) in the first image frame which are identified by the dense motion vectors.

51. The data compression method of claim 50, further comprising the step of:

designating MF and UB as the failure regions in the second image frame.

52. The date compression method of claim 51, wherein said failure regions identifying step comprises:

selecting a first failure-identifying threshold level in accordance with said failure-identifying constraint, said failure regions (BTBC) being identified as regions where an absolute difference of pixel signal levels between the original and the compressed first image frame, is in excess of said first threshold level; and selecting a second failure-identifying threshold level in accordance with said failure-identifying constraint, said MF and said UB being identified as regions where an absolute difference of pixel signal levels between the original uncompressed second image frame and said estimated second image frame is in excess of said second threshold level.

53. The data compression method of claim 51, wherein said node point designation assigning step further comprises the steps of:

modifying the location of node points detected to be located within a failure region; and selecting the initial node points on the boundary of BTBC.

54. The data compression method of claim 53, wherein said location modifying step comprises the steps of:

deleting said node points which are in BTBC, MF and UB; and generating new node points in MF and UB.

55. The data compression method of claim 29 wherein said mesh generating step further comprises the step of:

arranging said plurality of interconnected triangular patches so as to form a common node point among one of the node points of each of the patches whereby remaining node points of each of the patches have node point coordinates defining a polygonal boundary.

56. The data compression method of claim 55 wherein said motion estimating step includes the steps of:

determining an estimate of the node point motion vector of the common node point wherein a least squares statistical solution is used to minimize a displaced frame difference over the patches defining the polygonal boundary; and establishing motion constraints on the common node point and on the node points defining the polygonal boundary.

57. The data compression method of claim 29 wherein said dense motion computing step further includes the step of:

computing a displaced frame difference (DFD) when a plurality of pixel regions of the second image frame are displaced with respect to identical pixel regions of the first image frame.

58. In a video data compression system in a sending unit for transmitting at a constant data bit rate over a data link in accordance with a communication standard between said sending unit and a receiving unit of data of a temporal sequence of image frames of video signals in which each image frame is represented prior to data compression by a two-dimensional coordinate array of a number of digitized picture elements (pixels) having associated pixel signal levels representative of spatial image gradients corresponding to a scene content and wherein said sequence includes a temporally first image frame and at least a temporally second image frame having at least one pixel region displaced in correspondence with motion of said scene content with respect to an identical pixel region of said first image frame, the data compression system comprising:

means for temporarily storing the pixel signal levels of said first image frame;

means for determining the values and the coordinate locations of said spatial image gradients on a pixel-by-pixel basis within said first and second image frames;

means for computing a dense motion field of dense motion vectors on a pixel-by-pixel basis representing the values and directions of motion of said scene content of said temporally second image frame with respect to said temporally first image frame; and means for generating a two-dimensional model of a mesh overlay on said first image frame, said mesh model comprising a plurality of interconnected shape-adaptive triangular patches with each patch having node points with respectively associated node point coordinates, each of said patches being defined on said first image frame in accordance with mesh-generating constraints and spatial gradients and displaced frame differences.

59. The data compression system of claim 58, wherein said mesh-generating means comprises:

means for selecting a mesh-generating threshold level in accordance with one of said mesh-generating constraints, said coordinates of said node points of said triangular patches on said first image frame being defined by values of said spatial gradients exceeding said selected threshold level, and said displaced frame differences; and means for selecting a minimum coordinate distance which defines a closest distance between neighboring node points in accordance with another one of said mesh-generating constraints, said minimum coordinate distance being selected on the basis of said number of pixels contained in said two-dimensional coordinate array of pixels.

60. The data compression system of claim 58, wherein said mesh-generating means further comprises:

means for arranging said plurality of interconnected triangular patches so as to form a common node point among one of the node points of each of the patches whereby remaining node points of each of the patches have node point coordinates defining a polygonal boundary.

61. The data compression system of claim 58 further comprising:

means for obtaining the triangular patches using a Delauney triangulization algorithm; and means for refining the patches using a split-and-merge algorithm.

62. The data compression system of claim 58, wherein said computing means includes means for computing a displaced frame difference (DFD) where a plurality of pixel regions of the second image frame are displaced with respect to identical pixel regions of said first image frame.

63. In a video data compression system in a sending unit for transmission at a constant data bit rate over a data link in accordance with a communication standard between said sending unit and a receiving unit of data of a temporal sequence of image frames of video signals in which each image frame is represented prior to data compression by a two-dimensional coordinate array of a number of digitized picture elements (pixels) wherein said sequence includes a temporally first image frame and at least a temporally second image frame, the frames having scene contents containing spatial gradients and also having regions displaced corresponding to motion of the scene content, the data compression system comprising:

means for computing a dense motion field of dense motion vectors on a pixel-by-pixel basis representing the values and directions of motion of said scene content of said temporally second image frame with respect to said temporally first image frame;

means for generating a two-dimensional model of a mesh overlay on said first image frame, said mesh model comprising a plurality of interconnected shape-adaptive triangular patches with each patch having node points with respectively associated node point coordinates, each of said patches being defined on said first image frame in accordance with mesh-generating constraints and spatial gradients and displaced frame differences;

means for assigning a designation to each one of said shape-adaptive triangular patches in accordance with a patch-assigning constraint and to each one of the node points associated therewith;

means for estimating and thereby parameterizing the motion of each one of said node points of said triangular patches overlaid on said first image frame in response to said dense motion vectors, said node point motion being estimated in accordance with motion-estimating constraints by an application of a statistical solution to an affine transformation of said first image frame, whereby said dense motion vectors are data-compressed into estimated node point motion vectors having second coordinates associated therewith and wherein all estimated node point motion vectors together comprise a representation of a data-compressed estimated second image frame;

means for identifying failure regions (MF and UB) in said data-compressed estimated second image frame wherein a difference is computed between the pixel signal levels of the uncompressed second image frame and said data-compressed estimated second image frame in accordance with failure-identifying constraints, whereby each failure region is defined as such rectangular coordinate array of pixels of the uncompressed second image frame which encloses the pixels within a failure region identified in said temporally second image frame; and means for establishing a bit budget for the data to be transmitted at said constant data bit rate by said sending unit to said receiving unit.

64. The data compression system of claim 63, wherein said patch designation assigning means comprises:

means for rank ordering said triangular patches on the basis of the values and directions of said dense motion vectors obtained from said computing means and located within each patch in accordance with the following relationship, $$O_k = \alpha_1 \frac{D_k}{N_k} + \alpha_2 \frac{1}{\sigma_k^2}$$

where $O_k$ is the rank order of a patch k $\alpha_1$, $\alpha_2$ are positive scalars selected such that $$\alpha_1 \frac{D_k}{N_k}$$

and $$\alpha_2 \frac{1}{\sigma_k^2}$$

are of the same order, $D_k$ is the displaced region difference (DRD) within a patch k, $N_k$ is the total number of pixels within a patch k, $\sigma_k^2$ is the variance among the pixel signal levels within a patch k, wherein patches having the highest variance are assigned the highest rank and correspondingly highest priority for processing by said motion estimating means in accordance with at least one of said patch-assigning constraints, and said means for rank ordering using a function of $D_k$, $N_k$, and $\sigma_k^2$.

65. The data compression system of claim 63, wherein said motion estimating means comprises:

means for deriving the motion of each pixel within a triangular patch overlaid on said temporally first image frame to new coordinate locations in said estimated second image frame in accordance with the following relationships, $$\tilde{u}_j = \tilde{x}'_j - x_j = (a_{i1} - 1)x_j + a_{i2}y_j + a_{i3}$$

$$\tilde{v}_j = \tilde{y}'_j - y_j = a_{i4}x_j + (a_{i5} - 1)y_j + a_{i6},$$

where $x_j$, $y_j$ are the coordinates of a pixel, j, within a patch i of the first image frame, $\tilde{x}'_j$, $\tilde{y}'_j$ are the estimated coordinates of a matching pixel within the patch i of the estimated second image frame, $\tilde{u}_j$, $\tilde{v}_j$ are the estimated parametric motion vectors of the pixel j, $a_{i1}, \ldots a_{i6}$ are affine parameters for patch i, and wherein $\tilde{u}_j = (\tilde{x}'_j - x_j)$ and $\tilde{v}_j = (\tilde{y}_j - y_j)$ are flow constraints or estimates in accordance with said motion-estimating constraints;

means for determining an estimate of said node point motion vectors of the three node points of an ith triangular patch overlaid on said first image frame, in accordance with the following relationship, $$\sum_{j=1}^{N_i} (\tilde{u}_j - u_j)^2 + (\tilde{v}_j - v_j)^2$$

where $N_i$ is the number of estimated dense motion vectors within the first triangular patch, the relationship being minimized with respect to the affine parameters $a_{i1}, \ldots, a_{i6}$ by an application of said solution in accordance with the following relationship, $$\begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ & & \cdot & & & \\ & & \cdot & & & \\ & & \cdot & & & \\ x_{Ni} & y_{Ni} & 1 & 0 & 0 & 0 \\ 0 & 0 & 0 & x_{Ni} & y_{Ni} & 1 \end{bmatrix} \begin{bmatrix} a_{i1} \\ a_{i2} \\ a_{i3} \\ a_{i4} \\ a_{i5} \\ a_{i6} \end{bmatrix} = \begin{bmatrix} x_1' \\ y_1' \\ x_2' \\ y_1' \\ \cdot \\ \cdot \\ \cdot \\ x_{Ni}' \\ y_{Ni}' \end{bmatrix}$$

where $x_1, \ldots, x_{Ni}$ and $y_1, \ldots, y_{Ni}$ are the respective starting coordinates of all $N_i$ dense motion vectors within the ith triangular patch of the first image frame $x'_1, \ldots, x'_{Ni}$ and $y'_1, \ldots, y'_{Ni}$ are the respective ending coordinates of all $N_i$ dense motion vectors within the ith patch of the estimated uncompressed second image frame $a_{i1}, \ldots, a_{i6}$ are the affine parameters, and wherein the node point motion vectors of said three node points are included therein and can be extracted therefrom.

66. The data compression system of claim 63 and having said plurality of interconnected triangular patches arranged to form a common node point among one of the node points of each of the patches with remaining node points of each of the patches having node point coordinates defining a polygonal boundary, and wherein said motion estimating means comprises:

means for determining an estimate of said node point motion vector of said common node point wherein said statistical solution is a least squares solution to minimizing a displaced frame difference over the patches defining said polygonal boundary, said determining means including means for establishing motion constraints on the node points forming the common node point and on the node points common to adjoining patches and defining said polygonal boundary.

67. The data compression system of claim 63, wherein said motion estimating means further comprises:

means for preserving the connectivity among said plurality of interconnected shape-adaptive triangular patches of said mesh overlay model, wherein each node point common to adjoining triangular patches has one and the same node point motion vector in accordance with another one of said motion-estimating constraints, and wherein said means for preserving the connectivity uses a polygonal boundary constraint.

68. The data compression system of claim 63 wherein said pixels in each array have associated pixel signal levels corresponding to the contents of the scenes depicted by each of said frames, and wherein said sequence includes a temporally first frame and a temporally second frame having at least one pixel region displaced in correspondence with the motion of said scene content with respect to an identical pixel region of said first frame and further comprising:

means for storing temporarily the pixel signal levels of said first frame, means for determining the values and coordinate locations of said spatial gradients on a pixel-by-pixel basis within said first and second frames, and wherein said computing means further comprises means for computing the difference between the values of said spatial gradients at identical coordinate locations within said frames whereby to provide said dense motion vectors.

69. The data compression system of claim 63, wherein said failure regions identifying means comprises:

means for selecting a first failure-identifying threshold level in accordance with said failure-identifying constraints, a failure region (BTBC) being identified as a region where an absolute difference of pixel signal levels between the original and the compressed first image frame is in excess of said first threshold level; and means for selecting a second failure-identifying threshold level in accordance with said failure-identifying constraints, said MF and said UB being identified as regions where an absolute difference of pixel signal levels between the original uncompressed second image frame and said estimated second image frame is in excess of said second threshold level.

70. The data compression system of claim 63, wherein said bit budget establishing means comprises:

means for counting as data bits the node point motion vectors; and means for calculating a data bit rate fraction corresponding to said counted data bits, said fraction being calculated with respect to said constant data bit rate of the data to be transmitted.

71. The data compression system of claim 63, wherein said failure region identifying means further comprises:

means for setting an upper limit value for an allowable number of failure regions as a fraction of all regions within said data-compressed estimated second image frame;

means for detecting said fraction of said allowable number of failure regions;

means for deciding that said estimated second image frame constitutes a new first image frame whenever said fraction of said allowable number of failure regions is higher than said upper limit value; and means for resetting said node point estimating means, said mesh-generating means, and said patch designation assigning means to generate a new mesh for a new first image frame.

72. The data compression system of claim 63, wherein said bit budget establishing means further comprises:

means for ascertaining an overall signal-to-noise ratio of the data compression system in accordance with the following relationship, $$PSNR = 10\log_{10}\frac{255^2}{MSD}$$

where

PSNR is the peak signal-to-noise ratio 255 is the maximum number of pixel signal levels representative of spatial image gradients of a scene content MSD is the mean square difference of the estimated and original second frames.

73. The data compression system of claim 63, wherein said mesh generating means comprises:

means for selecting a mesh-generating threshold level in accordance with one of said mesh-generating constraints, said coordinates of said node points of said triangular patches on said first image frame being defined by values of said spatial gradients exceeding said selected threshold level, and said displaced frame differences;

means for selecting a minimum coordinate distance which defines a closest distance between neighboring node points in accordance with another one of said mesh-generating constraints, said minimum coordinate distance being selected on the basis of said number of pixels contained in said two-dimensional coordinate array of pixels; and means for identifying failure regions in said first frame and means for detecting the location of each one of said node points such that it does not fall within said failure regions.

74. In a video data compression system in a sending unit for transmission at a constant data bit rate over a data link in accordance with a communication standard between said sending unit and a receiving unit of data of a temporal sequence of image frames of video signals in which each image frame is represented prior to data compression by a two-dimensional coordinate array of a number of digitized picture elements (pixels) wherein said sequence includes a temporally first image frame and at least a temporally second image frame, the frames having scene contents containing spatial gradients and also having regions displaced corresponding to motion of the scene content, the data compression system comprising:

means for computing a dense motion field of dense motion vectors on a pixel-by-pixel basis representing the values and directions of motion of said scene content of said temporarlly second image frame with respect to said temporally first image frame;

means for generating a two-dimensional model of a mesh overlay on said first image frame, said mesh model comprising a plurality of interconnected shape-adaptive triangular patches with each patch having node points with respectively associated node point coordinates, each of said patches being defined on said first image frame in accordance with mesh-generating constraints and spatial gradients and displaced frame differences and wherein said plurality of interconnected patches are arranged to form a common node point among one of the node points of each of the patches with remaining node points of each of the patches having node point coordinates defining a polygonal boundary;

means for assigning a designation to each one of said shape-adaptive triangular patches in accordance with a patch-assigning constraint and to each one of the node points associated therewith; and means for estimating and thereby parameterizing the motion of each one of said polygonal boundary node points and of said common node point of said triangular patches overlaid on said first image frame in response to said dense motion vectors, said node point motion being estimated in accordance with a motion-estimating constraint by an application of statistical solution to an affine transformation of said first image frame, whereby said dense motion vectors are data-compressed into estimated node point motion vectors having second coordinates associated therewith and wherein all estimated node point motion vectors together comprise a representation of a data-compressed estimated second image frame.

75. The data compression system of claim 74, wherein said motion estimating means comprises:

means for deriving the node point motion vectors of said polygonal boundary node points and of said common node point from said dense motion vectors by a least squares statistical solution whereby a difference of said displaced regions and alternatively a displaced frame difference (DFD) is minimized over said patches having said assigned designations in accordance with the following relationships, $$\underline{H}\cdot\underline{a}=\underline{0},$$

where 0 is a vector of the common node point whose vector elements are zero,

H is a matrix equation as follows:

$$H=\begin{array}{c} 1st \\ 2nd \\ 3rd \\ \cdot \\ \cdot \\ \cdot \\ \cdot \\ 2_{N-2} \\ 2_{N-1} \end{array}\left[\begin{array}{ccccccc|ccccccc} x_1 & y_1 & -x_1 & -y_1 & \cdot & \cdot & \cdot & 0 & 1 & -1 & \cdot & \cdot & \cdot & \cdot \\ x_0 & y_0 & -x_0 & -y_0 & \cdot & \cdot & \cdot & 0 & 1 & -1 & \cdot & \cdot & \cdot & \cdot \\ 0 & 0 & x_2 & y_2 & -x_2 & y_2 & \cdot & 0 & 0 & 1 & -1 & \cdot & \cdot & \cdot \\ &&&&&&&&&&&&& \\ &&&&&&&&&&&&& \\ &&&&&&&&&&&&& \\ \cdot & \cdot & \cdot & \cdot & x_{N-1} & y_{N-1} & -x_{N-1} & -y_{N-1} & \cdot & \cdot & \cdot & \cdot & 1 & -1 \\ \cdot & \cdot & \cdot & \cdot & x_0 & y_0 & -x_0 & -y_0 & \cdot & \cdot & \cdot & \cdot & 1 & -1 \\ -x_N & -y_N & \cdot & \cdot & \cdot & \cdot & x_N & y_N & -1 & \cdot & \cdot & \cdot & \cdot & 1 \end{array}\right]$$

(column markers above the matrix: (2N − 1)th column; 2Nth column; 3Nth column)

where rows and columns of the matrix are designated, $x_0, y_0, -x_0, -y_0$ are the respective coordinates of the common node point, $x_1, y_1, -x_1, -y_1 \ldots, x_N, y_N, -x_N, -y_N$ are the respective coordinates of the polygonal boundary node points;

with unspecified matrix elements having a zero value, and a is given by:

$$a=\begin{bmatrix} a_{11} \\ a_{12} \\ a_{21} \\ a_{22} \\ a_{31} \\ a_{32} \\ \cdot \\ \cdot \\ \cdot \\ a_{(N-1)1} \\ a_{(N-1)2} \\ a_{N1} \\ a_{N2} \\ a_{13} \\ a_{23} \\ \cdot \\ \cdot \\ \cdot \\ a_{(N-1)3} \\ a_{N3} \end{bmatrix}$$

where $(a_{i1}, a_{i2}, a_{i3}, a_{i4}, a_{i5}, a_{i6})$ are the affine parameters associated with an ith triangle, the first 3 affine parameters $(a_{i1}, a_{i2}, a_{i3})$ are decoupled from the last 3 affine parameters $(a_{i4}, a_{i5}, a_{i6})$, whereby only the matrix equation governing the first 3 affine parameters of each triangle of the polygon is used, and wherein said least squares statistical solution is utilized in accordance with motion-estimating constraints.

76. The data compression system of claim 75, wherein said motion-estimating constraints include one constraint that the common node point of all intersecting triangular patches must have one node point motion vector, and another constraint that each polygonal boundary node point common to adjoining triangular patches must have one and the same node point motion vector.

77. In a video data compression method in a sending unit for transmission at a constant data bit rate over a data link in accordance with a communication standard between said sending unit and a receiving unit of data of a temporal sequence of image frames of video signals in which each image frame is represented prior to data compression by a two-dimensional coordinate array of a number of digitized picture elements (pixels) wherein said sequence includes a temporally first image frame and at least a temporally second image frame, the frames having scene contents containing spatial gradients and also having regions displaced corresponding to motion of the scene content, the data compression method comprising the steps of:

computing a dense motion field of dense motion vectors on a pixel-by-pixel basis representing the values and directions of motion of said scene content of said temporally second image frame with respect to said temporally first image frame;

generating a two-dimensional model of a mesh overlay on said first image frame, said mesh model comprising a plurality of interconnected shape-adaptive triangular patches with each patch having node points with respectively associated node point coordinates, each of said patches being defined on said first image frame in accordance with mesh-generating constraints and spatial gradients and displaced frame differences, and wherein said plurality of interconnected patches are arranged to form a common node point among one of the node points of each of the patches with remaining node points of each of the patches having node point coordinates defining a polygonal boundary;

assigning a designation to each one of said shape-adaptive triangular patches in accordance with a patch-assigning constraint and to each one of the node points associated therewith;

estimating and thereby parameterizing the motion of each one of said polygonal boundary node points and of said common node points of said triangular patches overlaid on said first image frame in response to said dense motion vectors, said node point motion being estimated in accordance with motion-estimating constraints by an application of a statistical solution to an affine transformation of the first image frame, whereby said dense motion vectors are data-compressed into estimated node point motion vectors having second coordinates associated therewith and wherein all estimated node point motion vectors together comprise a representation of a data-compressed estimated second image frame;

identifying failure regions (MF and UB) in said data-compressed estimated second image frame wherein a difference is computed between the pixel signal levels of a temporarily stored uncompressed second image frame and said data-compressed estimated second image frame in accordance with a failure-identifying constraint, whereby each failure region is defined as such rectangular coordinate array of pixels of the uncompressed second image frame which encloses the pixels within a failure region identified in said temporally second image frame; and establishing a bit budget for the data to be transmitted at said constant data bit rate by said sending unit to said receiving unit.

78. The data compression method of claim 77, wherein said pixels in each array have associated pixel signal levels corresponding to the contents of the scenes depicted by each of said frames, and wherein said sequence includes a temporally first frame and a temporally second frame having at least one pixel region displaced in correspondence with the motion of said scene content with respect to an identical pixel region of said first frame and further comprising the steps of:

storing temporarily the pixel signal levels of said first frame, determining the values and coordinate locations of said spatial gradients on a pixel-by-pixel basis within said first and second image frames, and wherein said computing step further includes the step of computing the difference between the values of said spatial gradients at identical coordinate locations within said frames whereby to provide said dense motion vectors.

79. The data compression method of claim 77, further comprising the steps of:

obtaining the triangular patches by a Delauney triangulization algorithm; and refining the patches by a split-and-merge algorithm.

80. The data compression method of claim 77, wherein said dense motion vector computing step comprises:

selecting a two-dimensional (2-D) motion field estimation algorithm to obtain dense motion vectors for each pixel location.

81. The data compression method of claim 80, wherein said mesh generating step comprises:

selecting a mesh-generating threshold level in accordance with one of said mesh-generating constraints, said coordinates of said node points of said triangular patches on said first image frame being defined by values of said spatial gradients in excess of said selected mesh-generating threshold level, and by displaced region differences;

selecting a minimum coordinate distance which defines a closest distance between neighboring node points in accordance with another one of said mesh-generating constraints, said minimum coordinate distance selected on the basis of a number of pixels contained in said two-dimensional coordinate array of pixels;

identifying failure regions in said first image frame; and selecting the location of each one of said node points such that each node point is located outside each one of said failure regions.

82. The data compression method of claim 81, wherein said patch designation assigning step comprises:

rank ordering said triangular patches on the basis of the values and directions of said dense motion vectors obtained from said dense motion field computing step and located within each patch in accordance with the following relationship, $$O_k = \alpha_1 \frac{D_k}{N_k} + \alpha_2 \frac{1}{\sigma_k^2}$$

where $O_k$ is the rank order of a patch k $\alpha_1, \alpha_2$ are positive scalars selected such that $$\alpha_1 \frac{D_k}{N_k}$$

and $$\alpha_2 \frac{1}{\sigma_k^2}$$

are of the same order $D_k$ is the displaced frame difference (DFD) within a patch k, $N_k$ is the total number of pixels within a patch k, $\sigma_k^2$ is the variance among the pixel signal levels within a patch k wherein patches having the highest variance are assigned the highest rank and correspondingly highest priority for processing by said motion estimating step in accordance with one of said patch-assigning constraints; and rank ordering by a function of $D_k$, $N_k$, and $\sigma_k^2$.

83. The data compression method of claim 82, wherein said motion estimating step comprises:

deriving the node point motion vectors of said polygonal boundary node points and of said common node point from said dense motion vectors by a least squares statistical solution whereby a difference of said displaced frame difference (DFD) is minimized over said patches having said assigned designations in accordance with the following relationships, $$\underline{H}\cdot\underline{a}=\underline{0},$$

where 0 is a vector of the common node point whose vector elements are zero,

H is a matrix equation as follows:

$$H=\begin{array}{r}\\ \text{1st}\\ \text{2nd}\\ \text{3rd}\\ \cdot\\ \cdot\\ \cdot\\ \cdot\\ 2_{N-2}\\ 2_{N-1}\end{array}\left[\begin{array}{ccccccc|cccccccc}
 & & & & & & (2N-1)\text{th column} & 2N\text{th column} & & & & & & & 3N\text{th column}\\
x_1 & y_1 & -x_1 & -y_1 & \cdot & \cdot & \cdot & 0 & 1 & -1 & \cdot & \cdot & \cdot & \cdot & \\
x_0 & y_0 & -x_0 & -y_0 & \cdot & \cdot & \cdot & 0 & 1 & -1 & \cdot & \cdot & \cdot & \cdot & \\
0 & 0 & x_2 & y_2 & -x_2 & y_2 & \cdot & 0 & 0 & 1 & -1 & \cdot & \cdot & \cdot & \\
 & & & & & & & & & & & & & & \\
 & & & & & & & & & & & & & & \\
 & & & & & & & & & & & & & & \\
\cdot & \cdot & \cdot & \cdot & x_{N-1} & y_{N-1} & -x_{N-1} & -y_{N-1} & \cdot & \cdot & \cdot & \cdot & 1 & -1 & \\
\cdot & \cdot & \cdot & \cdot & x_0 & y_0 & -x_0 & -y_0 & \cdot & \cdot & \cdot & \cdot & 1 & -1 & \\
-x_N & -y_N & \cdot & \cdot & \cdot & \cdot & x_N & y_N & -1 & \cdot & \cdot & \cdot & \cdot & 1 &
\end{array}\right]$$

where rows and columns of the matrix are designated, $x_0, y_0, -x_0, -y0$ are the respective coordinates of the common node point, $x_1, y_1, -x_1, -y_1 \ldots, x_N, y_N, -x_N, -y_N$ are the respective coordinates of the polygonal boundary node points; with unspecified matrix elements having a zero value, and a is given by:

$$a=\begin{bmatrix} a_{11}\\ a_{12}\\ a_{21}\\ a_{22}\\ a_{31}\\ a_{32}\\ \cdot\\ \cdot\\ \cdot\\ a_{(N-1)1}\\ a_{(N-1)2}\\ a_{N1}\\ a_{N2}\\ a_{13}\\ a_{23}\\ \cdot\\ \cdot\\ \cdot\\ a_{(N-1)3}\\ a_{N3}\end{bmatrix}$$

where $(a_{i1}, a_{i2}, a_{i3}, a_{i4}, a_{i5}, a_{i6})$ are the affine parameters associated with an ith triangle, the first 3 affine parameters $(a_{i1}, a_{i2}, a_{i3})$ are decoupled from the last 3 affine parameters ($a_{i4}$, $a_{i5}$, $a_{i6}$), whereby only the matrix equation governing the first 3 affine parameters of each triangle of the polygon is used, and wherein said least squares statistical solution is utilized in accordance with motion-estimating constraints.

84. The data compression method of claim 83, wherein said motion estimating constraints utilizing step includes the steps of:

defining one constraint so that the common node point of all intersecting triangular patches has one node point motion vector; and defining another constraint so that each polygonal boundary node point common to adjoining triangular patches has one and the same node point motion vector.

85. The data compression method of claim 83, wherein said failure regions identifying step comprises:

selecting a first failure-identifying threshold level in accordance with said failure-identifying constraint, failure region (BTBC) being identified as a region where an absolute difference of pixel signal levels between the original and the compressed first image frame is in excess of said first threshold level; and selecting a second failure-identifying threshold level in accordance with said failure-identifying constraint, said MF and said UB being identified as regions where an absolute difference of pixel signal levels between the original uncompressed second image frame and said estimated second image frame is in excess of said second threshold level.

86. The data compression method of claim 85, wherein said bit budget establishing step comprises:

counting as data bits the node point motion vectors; and calculating a data bit rate fraction corresponding to said counted data bits, said fraction being calculated with respect to said constant data bit rate of the data to be transmitted.

* * * * *